United States Patent
Yu et al.

(10) Patent No.: US 7,844,763 B2
(45) Date of Patent: Nov. 30, 2010

(54) DIFFERENTIAL DATA TRANSFER FOR FLASH MEMORY CARD

(75) Inventors: I-Kang Yu, Palo Alto, CA (US);
Horng-Yee Chou, Palo Alto, CA (US);
Szu-Kuang Chou, Cupertino, CA (US);
Charles C. Lee, Cupertino, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 12/608,842

(22) Filed: Oct. 29, 2009

(65) Prior Publication Data

US 2010/0049878 A1    Feb. 25, 2010

Related U.S. Application Data

(63) Continuation of application No. 10/917,576, filed on Aug. 13, 2004, now Pat. No. 7,673,080, and a continuation-in-part of application No. 10/708,172, filed on Feb. 12, 2004, now Pat. No. 7,021,971.

(51) Int. Cl.
*G06F 13/12* (2006.01)
*G06F 13/00* (2006.01)

(52) U.S. Cl. .................. 710/62; 710/300; 710/301; 711/115; 711/154

(58) Field of Classification Search ............... None
See application file for complete search history.

(56) References Cited

U.S. PATENT DOCUMENTS

| 4,161,719 | A | 7/1979 | Parikh et al. |
| 4,686,506 | A | 8/1987 | Farago |
| 4,818,239 | A | 4/1989 | Erk |
| 5,563,769 | A | 10/1996 | MacGregor |
| 5,718,599 | A | 2/1998 | Ichikawa et al. |
| 5,766,033 | A | 6/1998 | Davis |
| 5,772,453 | A | 6/1998 | Tan et al. |
| 5,891,483 | A | 4/1999 | Miyajima |

(Continued)

OTHER PUBLICATIONS

"SD Memory Card Specifications", Simplified Version of: Part 1, Physical Layer Specification, Version 1.01, Apr. 15, 2001, SD Group, Matsushita Electric Industrial Co., Ltd. (MEI), SanDisk Corporation, Toshiba Corporation, pp. 1-32.

(Continued)

*Primary Examiner*—Alan Chen
(74) *Attorney, Agent, or Firm*—Bever, Hoffman & Harms, LLP; Jeanette S. Harms

(57) ABSTRACT

A flash memory card includes a differential datapath that enables communications between the flash memory card and a host device to be performed using differential signals. The differential datapath can translate between the differential signals and card-specific signals that control read/write operations to the memory array of the flash memory card. The card-specific signals can be standard MultimediaCard, Secure-Digital card, Memory Stick, or CompactFlash card signals, among others. A host device that provides differential data transfer capability can include a similar differential datapath. By using differential data transfer rather than conventional clocked data transfer, overall data bandwidth between a flash memory card and a host device can be significantly increased, while simultaneously decreasing power consumption and pin requirements.

3 Claims, 22 Drawing Sheets

U.S. PATENT DOCUMENTS

| | | | |
|---|---|---|---|
| 6,040,622 | A | 3/2000 | Wallace |
| 6,089,879 | A | 7/2000 | Babcock |
| 6,102,743 | A | 8/2000 | Haffenden et al. |
| 6,166,913 | A | 12/2000 | Fun et al. |
| D445,096 | S | 7/2001 | Wallace |
| D452,690 | S | 1/2002 | Wallace et al. |
| D452,865 | S | 1/2002 | Wallace et al. |
| D453,934 | S | 2/2002 | Wallace et al. |
| 6,381,143 | B1 | 4/2002 | Nakamura |
| 6,399,906 | B1 | 6/2002 | Sato et al. |
| 6,410,355 | B1 | 6/2002 | Wallace |
| 6,445,088 | B1 | 9/2002 | Spitaels et al. |
| 6,462,273 | B1 | 10/2002 | Corisis et al. |
| 6,527,188 | B1 | 3/2003 | Shobara et al. |
| 6,554,648 | B2 | 4/2003 | Shi et al. |
| 6,609,928 | B1 | 8/2003 | Le |
| 6,624,005 | B1 | 9/2003 | DiCaprio et al. |
| 6,634,561 | B1 | 10/2003 | Wallace |
| 6,659,805 | B2 | 12/2003 | Siddiqui et al. |
| 6,941,402 | B2 | 9/2005 | Tashiro |
| 7,159,064 | B2 | 1/2007 | Gillet |
| 2002/0124200 | A1 | 9/2002 | Govindaraman |
| 2003/0154340 | A1 | 8/2003 | Bolt et al. |
| 2003/0229748 | A1 | 12/2003 | Brewer et al. |
| 2004/0098545 | A1 | 5/2004 | Pline et al. |
| 2005/0160223 | A1* | 7/2005 | Chen et al. .................. 711/115 |

OTHER PUBLICATIONS

"MultiMediaCard Specification Version 4.0 is Released", Feb. 2, 2004, Tom Mahon, Thomas Mahon Associates, 3 pgs.

Preethi Ramkumar, CRC-Cyclic Redundancy Check, Birds-Eye.Net, http://www.birds-eye.net/definition/c/crc-cyclic_redundancy_check.shtml.

USB Implementers Forum, Inc., Cyclic Redundancy Checks in USB, Sep. 16, 2003, USB Implementers Forum, Inc., http://web.archive.org/web/20030916090112/http://www.usb.org/developers/whiepapers/crcdes.pdf, p. 1-6.

* cited by examiner

| PIN | DIRECTION | MMC | SPI | SD | USB | PCIE | SATA | 1394 |
|---|---|---|---|---|---|---|---|---|
| 1 | I/O | | CS | DAT3 | RSV | Tn0 | A- | TPA* |
| 2 | I/O | CMD | DIN | CMD | CMD | CMD/Tp0 | CMD/A+ | CMD/TPA |
| 3 | | VSS1 | VSS1 | VSS1 | VSS1 | VSS1 | VSS1 | VSS1 |
| 4 | | VDD | VDD | VDD | VDD | VDD | VDD | VDD |
| 5 | I | CLK | CLK | CLK | CLK | CLK | CLK | CLK |
| 6 | | VSS2 | VSS2 | VSS2 | VSS2 | VSS2 | VSS2 | VSS2 |
| 7 | I/O | DAT0 | DOUT | DAT0 | DAT0 | DAT0 | DAT0 | DAT0 |
| 8 | I/O | | | DAT1 | D+ | Rp0 | B+ | TPB |
| 9 | I/O | | | DAT2 | D- | Rn0 | B- | TPB* |

FIG. 10

| PIN | DIRECTION | MMC | SPI | SD | USB |
|---|---|---|---|---|---|
| 1 | I/O | | CS | | D- |
| 2 | I/O | CMD | DIN | CMD | CMD/D+ |
| 3 | | VSS1 | VSS1 | VSS1 | VSS1 |
| 4 | | VDD | VDD | VDD | VDD |
| 5 | I | CLK | CLK | CLK | CLK |
| 6 | | VSS2 | VSS2 | VSS2 | VSS2 |
| 7 | I/O | DAT0 | DOUT | DAT0 | DAT0 |

FIG. 11

| PIN | DIRECTION | MMC | SPI | SD | USB | PCIE | SATA | 1394 |
|---|---|---|---|---|---|---|---|---|
| 1 | I/O | DAT3 | CS | DAT3 | RSV | Tn0 | A- | TPA* |
| 2 | I/O | CMD | DIN | CMD | CMD | CMD/Tp0 | CMD/A+ | CMD/TPA |
| 3 | | VSS1 | VSS1 | VSS1 | VSS1 | VSS1 | VSS1 | VSS1 |
| 4 | | VDD | VDD | VDD | VDD | VDD | VDD | VDD |
| 5 | I | CLK | CLK | CLK | CLK | CLK | CLK | CLK |
| 6 | | VSS2 | VSS2 | VSS2 | VSS2 | VSS2 | VSS2 | VSS2 |
| 7 | I/O | DAT0 | DOUT | DAT0 | DAT0 | DAT0 | DAT0 | DAT0 |
| 8 | I/O | DAT1 | | DAT1 | D+ | Rp0 | B+ | TPB |
| 9 | I/O | DAT2 | | DAT2 | D- | Rn0 | B- | TPB* |
| 10 | I/O | DAT4 | | DAT4 | RSV | RSV | RSV | RSV |
| 11 | I/O | DAT5 | | DAT5 | RSV | RSV | RSV | RSV |
| 12 | I/O | DAT6 | | DAT6 | RSV | RSV | RSV | RSV |
| 13 | I/O | DAT7 | | DAT7 | RSV | RSV | RSV | RSV |

FIG. 12A

| PIN | DIRECTION | MEMORY STICK | MS PRO DUO | USB | PCIE | SATA | 1394 |
|---|---|---|---|---|---|---|---|
| 1 |  | VSS | VSS | VSS | VSS | VSS | VSS |
| 2 | I | BS | BS | BS | BS | BS | BS |
| 3 | I/O | VCC | DAT1 | DAT1/D- | DAT1/T- | DAT1/T- | DAT1/TPA* |
| 4 | I/O | DAT0 | DAT0 | DAT0/D+ | DAT0/T+ | DAT0/T+ | DAT0/TPA |
| 5 | I/O | RSV | DAT2 | DAT2 | DAT2/R- | DAT2/R- | DAT2/TPB* |
| 6 | O | INS | INS | INS | INS | INS | INS |
| 7 | I/O | RSV | DAT3 | DAT3 | DAT3/R+ | DAT3/R+ | DAT3/TPB |
| 8 | I | SCLK | SCLK | SCLK | SCLK | SCLK | SCLK |
| 9 |  | VCC | VCC | VCC | VCC | VCC | VCC |
| 10 |  | VSS | VSS | VSS | VSS | VSS | VSS |

FIG. 12B

DIFFERENTIAL DATA TRANSFER FOR FLASH MEMORY CARD

RELATED APPLICATIONS

This application is a continuation of U.S. patent application Ser. No. 10/917,576, entitled "Differential Data Transfer For Flash Memory Card" filed Aug. 13, 2004 which is a continuation-in-part of U.S. patent application for "Dual-Personality Extended-USB Plug and Receptacle with PCI-Express or Serial-At-Attachment Extensions", U.S. Ser. No. 10/708,172, filed Feb. 12, 2004, now U.S. Pat. No. 7,021,971.

FIELD OF THE INVENTION

This invention relates to removable-card interfaces, and more particularly to high-speed, low-power interfaces for flash memory cards.

RELATED ART

Flash-memory cards are widely used for storing digital pictures captured by digital cameras. One useful format is the Secure-Digital (SD) format, which is an extension of the earlier MultiMediaCard (MMC) format. SD cards are thin and the area of a large postage stamp. Sony's Memory Stick (MS) is another digital-file-card format that is shaped somewhat like a stick of chewing gum. The CompactFlash format provides another flash memory card form factor that is roughly square-shaped and larger than MMC and SD cards.

Flash memory cards are also useful as add-on memory cards for other devices, such as portable music players, personal digital assistants (PDAs), cell phones, and even notebook computers. Flash memory cards are hot-swappable, allowing the user to easily insert and remove such cards without rebooting or cycling power. Since the flash memory cards are small, durable, and removable, data files can easily be transported among electronic devices by being copied to a flash memory card. Note that certain card formats (e.g., SD cards and CF cards) are not limited to being flash-memory cards, but can be used in other applications such as communications transceivers.

Conventional flash memory cards transfer data via one or more clocked serial data lines—i.e., serial data is transmitted across each data line according to a clock signal provided on a separate clock line. The data transfer rate of conventional flash memory cards are therefore limited by the host clock rate. For example, FIG. 1A shows an interface between a conventional MMC card 110 and a conventional host device 130 (i.e., an electronic device such as a digital camera or MP3 player). Host device 130 includes a socket 131 and a host card controller 120 for communicating with MMC card 110. Host card controller 120 includes an MMC datapath 121, an MMC protocol controller (processor) 122, and an application adapter 123. Meanwhile, MMC card includes an MMC datapath 111, an MMC protocol controller (processor) 112, and a memory array 113.

MMC datapaths 121 and 111 provide the same basic functionality for host card controller 120 and MMC card 110, respectively, i.e., converting MMC-specific control signals CTRL and data signals DAT from MMC protocol controllers 122 and 112, respectively, into clocked command signals CMD and serial data signals SDAT, respectively, that can be transmitted between host card controller 120 and MMC card 110 across an MMC bus 150. Both signals SDAT and CMD are clocked by a clock signal CLK generated by MMC datapath 121. MMC datapaths 121 and 111 also convert received signals SDAT and CMD into MMC-specific data signals DAT and status signals ST, respectively. In the course of these data conversions, MMC datapaths 121 and 111 provide serial-to-parallel conversion for incoming signals SDAT and CMD, provide parallel-to-serial conversion to generate outgoing signals SDAT and CMD, perform frame detection to ensure proper read/write operations of memory array 113, and perform error checking (typically CRC checking of signals SDAT and CMD).

MMC protocol controllers 122 and 112 in host card controller 122 and MMC card 110, respectively, perform appropriate actions in response to the MMC-specific signals CTRL, ST, and DAT. The main difference between MMC protocol controller 122 in host card controller 120 and MMC protocol controller 112 in MMC card 110 is that MMC protocol controller 122 operates under the control of application adapter 123 to request read and write operations at MMC card 110, whereas MMC protocol controller 112 responds to those read and write requests by controlling access to memory array 113. The MMC communications protocol is described in greater detail in the version 3.31 MMC card specification.

To perform a data transfer between host card controller 120 and MMC card 110, MMC card 110 is first inserted into socket 131 (this insertion is not depicted for clarity) to initialize MMC card 110. Application adapter 123 instructs MMC protocol controller 122 to provide an appropriate MMC-specific control signal CTRL (e.g., "perform read operation") and an appropriately formatted data signal DAT (e.g., read address) to MMC datapath 121, which in turn generates MMC-specific command signal CMD and serial data signal SDAT (clocked by clock signal CLK). Application adapter 123 can generally be considered a bridge between host-specific communications and card-specific communications.

MMC datapath 111 in MMC card 110 receives command signal CMD and serial data signal SDAT, and converts those signals back into an appropriate status signal ST (e.g., read operation) and data signal DAT (e.g., read address). In response to those signals, MMC protocol controller 112 performs either a read or write operation on memory array 113, and generates an appropriate response via control signal CTRL (e.g., read successful) and data signal DAT (e.g., read data). MMC datapath 111 converts those signals into clocked signals CMD and SDAT that are transmitted to MMC datapath 121 in host card controller 120, which in turn converts clocked signals CMD and SDAT into an appropriate status signal ST (e.g., valid read data) and data signal DAT (e.g., read data). Finally, protocol controller 122 provides the confirmation information and/or data from signals ST and DAT to host device 130 (either directly or through application adapter 123).

In this manner, data transfer is provided between host device 130 and MMC card 110. The faster this communication operation can be performed, the more adeptly the MMC card can handle large data files (e.g., high megapixel digital camera images or video files). Because MMC card 110 uses a clocked data transfer protocol, the data bandwidth between host device 130 and MMC card 110 is determined by the frequency of clock signal CLK and the number of data lines transferring serial data SDAT.

For example, FIG. 1B shows the mechanical form factor for a version 3.31 MMC card 110A (i.e., a MMC card conforming to v3.31 of the MMC specification). MMC card 110A includes seven contact pads (pins), with the pin assignment shown in Table 1, below.

TABLE 1

| Pin No. | Name |
| --- | --- |
| 1 | |
| 2 | CMD |
| 3 | VSS1 |
| 4 | VDD |
| 5 | CLK |
| 6 | VSS2 |
| 7 | DAT0 |

As indicated in Table 1, pins 3, 4, and 7 are power supply pins, and are intended to receive supply voltages VSS1, VDD, and VSS2, respectively. Pin 2 is an I/O pin for receiving and responding to commands CMD, while pin 5 is for receiving clock signal CLK. Finally, pin 7 is an I/O pin for transferring data into and out of MMC 110A (pin 1 is unused in the v3.31 MMC specification). Thus, since MMC card 110A includes only a single data pin (pin 7), the only way to increase the data transfer rate for MMC card 110A is by increasing the frequency of clock signal CLK provided at pin 5. However, due to propagation delays and parasitics (e.g., stray capacitances and contact resistances) that degrade the signals across the MMC bus, the maximum clock rate of an MMC host controller is generally limited to 20 MHz. Therefore, the maximum data transfer rate for an MMC card is 2.5 MB/sec.

To overcome this data bandwidth limit, the latest MMC specification 4.0 increases the number of pins in the mechanical form factor. FIG. 1C shows the mechanical form factor for a version 4.0 MMC card 110B, with a conventional pin assignment listed in Table 2, below.

TABLE 2

| Pin No. | Name |
| --- | --- |
| 1 | DAT3 |
| 2 | CMD |
| 3 | VSS1 |
| 4 | VDD |
| 5 | CLK |
| 6 | VSS2 |
| 7 | DAT0 |
| 8 | DAT1 |
| 9 | DAT2 |
| 10 | DAT4 |
| 11 | DAT5 |
| 12 | DAT6 |
| 13 | DAT7 |

MMC card 110B includes all the pins shown for MMC card 110A (shown in FIG. 1B), and adds six additional pins 8-13 that provide additional data paths. Also, pin 1, which is unused in version 3.31 MMC card 110A, is also used as a data path in version 4.0 MMC card 110B. The pin assignment for version 4.0 MMC card 110B shown in FIG. 1C provides an 8-bit wide data bus capable of 52 MB/sec data bandwidth for a host clock frequency of 52 MHz.

Note, however, that this method of increasing data bandwidth by increasing the number of data I/O pins runs counter to the prevailing trend of decreasing the size of flash memory cards. Furthermore, the increase in data pins generates a corresponding increase in power consumption for the flash memory card, which can be particularly problematic for battery-operated devices that use the flash memory card.

SD cards and MMC cards have complementary card interfaces, and are sometimes lumped together and referred to as SD/MMC cards. While a version 3.31 MMC card has 7 metal contact pads, an SD card has 9 contact pads. MMC cards can fit in SD slots, and SD cards can sometimes fit in MMC slots (an SD card is typically thicker than an MMC card, and so will not be able to fit in certain MMC slots). However, the host must determine which type of card is inserted into its slot. When a MMC card is inserted, only 7 pads are used, while the additional 2 pads are used when a SD card is detected in the slot.

FIG. 2A shows a prior-art card-detection routine executed by a host. The host, such as a host personal computer (PC), detects when a card is inserted into a slot, step 200, such as by detecting the card-detect (CD) pin that is pulled high by a resistor on an SD card or by detecting the actuation of a mechanical switch in the slot by a feature on an MMC/SD card. The host sends a sequence of commands to the inserted card that includes a CMD55 command, step 202. If the card does not respond properly to the CMD55 command, step 204, then the card is an MMC card, not a SD card. In this case, a sequence of commands is sent to the MMC card, step 206, which includes the CMD1 command. The MMC card is then initialized by a sequence of commands, such as the host reading configuration registers on the MMC card, step 208. The host can then use the 7 pins shared with MMC to communicate with the MMC card.

If the inserted card responds to the CMD 55 command, step 204, then the card may be a SD card. Further commands are sent to the card including the advanced command ACMD41, step 210. If the card does not respond properly to the ACMD41, step 212, then the card fails, step 214.

If the card responds properly to the ACMD41, step 210, then the card is an SD card. The SD card is then initialized by a sequence of commands, such as the host reading configuration registers on the SD card, step 216. The host uses the 9-pin SD interface to communicate with the SD card. Note that the host can use one data line or up to four data lines in the SD interface for communication, depending on the circumstances of the communication (e.g., data structures, quality of the card-socket connection). Data stored on the SD card can be encrypted using higher-level security protocols.

FIG. 2B is a flowchart of a prior-art detection-response routine executed by a SD card. The SD card obtains power from the metal contact pads when inserted into the host slot and powers up, step 220. A card-initialization routine is started, step 222, which may include various internal self-checks. A controller inside the SD card executes these routines, activates the external interface, and then waits for (and responds to) commands from the host. The SD controller in the card waits for a CMD55 is from the host, step 224, and an ACMD41 from the host, step 226, and then responds to the ACMD41 from the host, step 228. The SD card is then ready to receive further commands from the host, step 230. The full 9-pin SD interface is used.

Note that because an SD card has a larger number of pins than a version 3.31 MMC card, the transfer rate of an SD card can be higher than that of a version 3.31 MMC card. the SD interface currently supports a top transfer rate of 100 Mb/s, which is sufficient for many applications. However, some applications, such as storage and transport of full-motion video, could benefit from even higher transfer rates. Future applications will only become more bandwidth-intensive. Therefore, the SD interface faces bandwidth (and power) issues that are similar to those described for the MMC interface with respect to FIGS. 1B and 1C. Other flash memory card protocols, which all use clocked data transfer methodologies, face similar data bandwidth limitations.

Other bus interfaces not used in flash memory cards can sometimes offer higher transfer rates. For example, Universal-Serial-Bus (USB) has a top transfer rate of 480 Mb/s. Peripheral-Component-Interconnect (PCI) Express, at 2.5 Gb/s, and Serial-Advanced-Technology-Attachment (SATA), at 1.5 Gb/s and 3.0 Gb/s, are two examples of high-speed serial bus interfaces for next generation devices. However, PCI Express and SATA are used mostly as internal expansion interfaces on PC's, due to their large interface requirements. For example, the SATA interface requires two separate connectors; a first 7-pin connector that carries signals and a second 15-pin connector that provides power.

Two bus interfaces that are typically used for external peripheral devices for PCs (IEEE 1394 (Firewire) and Serial Attached Small-Computer System Interface (SCSI)) can provide high data bandwidths. Firewire supports a maximum 3.2 Gb/s data transfer rate, while SCSI supports either a 1.5 Gb/s or a 3.0 Gb/s data transfer rate. These rates are 5 to 32 times faster than the maximum SD data transfer rate.

A new removable-card form-factor known as ExpressCard has been developed by the Personal-Computer Memory Card International Association (PCMCIA), PCI, and USB standards groups. An ExpressCard is about 75 mm long, 34 mm wide, and 5 mm thick and has an ExpressCard connector 28, and provides both USB and PCI Express interfaces on the same 26-pin card connector. However, the ExpressCard's large 26-pin connector limits its usefulness and increases the physical size of devices using ExpressCard connectors.

Thus, while certain bus interfaces can provide significantly higher data transfer rates than conventional flash memory cards, the large connectors (and increased power requirements) of such bus interfaces typically make them incompatible with the small form factor and reduced power requirements of flash memory cards. Accordingly, it is desirable to provide a flash memory card and protocol that allows increased data bandwidth without increasing interface size and/or power consumption.

SUMMARY OF THE INVENTION

To overcome the bandwidth limitations of conventional flash memory cards, a flash memory card protocol can be implemented that provides differential data transfer. The existing physical and electrical specifications for flash memory cards can be maintained while replacing clocked data transfer methodologies with differential data transfer methodologies to improve data bandwidth and reduce power consumption. According to an embodiment of the invention, the clock (CLK) and command (CMD) lines of conventional flash memory card interface protocols can be retained to provide backwards (legacy) compatibility or to provide card initialization.

In one embodiment, a flash memory card (e.g., a MMC card, an SD card, a CF card, or a Memory Stick, among others) can include a flash memory array, a protocol controller for accessing the flash memory array, and a differential datapath. The differential datapath converts an incoming differential signal into incoming data and/or status signals for the protocol controller, and converts outgoing data and/or control signals from the protocol controller into an outgoing differential signal.

In another embodiment, a host device configured to accept a flash memory card can include a host card adapter that includes a protocol controller for implementing the card-specific communications, an application adapter for bridging between application-specific communications and the protocol controller, and a differential datapath. The differential datapath converts an incoming differential signal into incoming data and/or status signals for the protocol controller, and converts outgoing data and/or control signals from the protocol controller into an outgoing differential signal.

In another embodiment, the flash memory card and/or the host card adapter in the host device can further include legacy datapaths for converting incoming clocked data and command signals into the incoming data and/or status signals, respectively, for the protocol controller, and for converting the outgoing data and/or control signals from the protocol controller into outgoing clocked data and/or command signals, respectively. The presence of the legacy datapath(s) can allow the flash memory card and/or the host device to communicate with conventional (i.e., clocked data-based) host devices and/or flash memory cards, respectively.

In another embodiment, the protocol controllers in the flash memory card and/or the host card adapter can be standard protocol controllers (e.g., MMC, SD, or Memory Stick protocol controllers), so long as the differential datapath can properly convert from the card-specific communications to differential communications. Differential data transfer capabilities can therefore be readily implemented in existing host devices (e.g., through hardware replacement or firmware updating).

The invention will be more fully understood in view of the following description and drawings.

BRIEF DESCRIPTION OF THE DRAWINGS

FIG. 10 is a table showing signal multiplexing with a 9-pin SD connector.

FIG. 11 is a table showing signal multiplexing with a 7-pin MMC connector.

FIG. 12A is a table showing pin multiplexing for an extended 13-pin connector.

FIG. 12B is a table showing pin multiplexing for a 10-pin Memory Stick system.

DETAILED DESCRIPTION

Conventional flash memory cards and the devices that use those cards have relatively low data transfer rates that can limit the utility of those flash cards in bandwidth-intensive applications. By enabling a differential data transfer protocol for use with flash memory cards, the data transfer rate to and from those cards can be significantly increased without requiring additional pins or increasing overall card size.

The differential data transfer capability can be combined with legacy (clocked data transfer) capabilities to enhance the compatibility of the flash memory card. For example, an SD card modified to use a higher-speed serial bus can be termed a very-high-speed SD card, or a VSD card, while a host that can communicate with a VSD card is a VSD host. A VSD card with legacy capabilities can act as a SD card when inserted into a legacy SD host, while a VSD host with legacy capabilities can read inserted SD cards. Thus the VSD card and host are backward-compatible.

Figure 3:
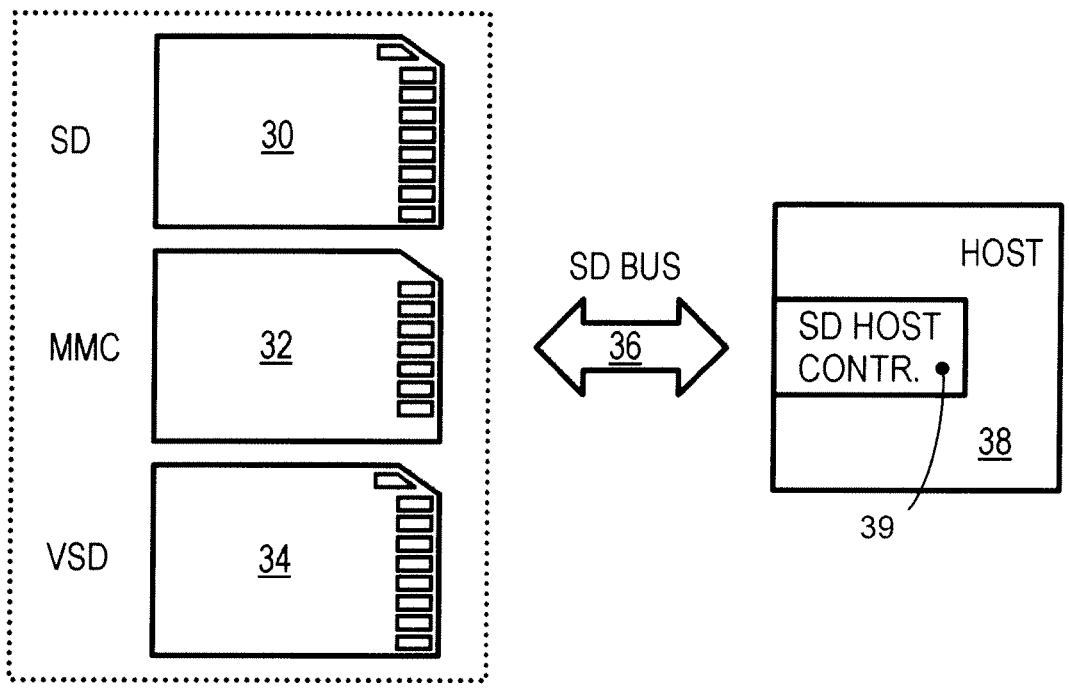
FIG. 3 shows a SD host accepting a MMC card, a SD card, or a Very-high-speed-Secure-Digital (VSD) card.

For example, FIG. 3 shows a SD host 38 accepting an MMC card 32, an SD card 30, or a VSD card 34. Host 38 includes a legacy SD host controller 39 that can detect and accept SD card 30 or MMC card 32. When VSD card 34 is inserted, SD host controller 39 detects an SD card and configures VSD card 34 to operate as a SD card over the standard 9-pin SD interface and SD bus 36.

MMC card 32 has only 7 metal pads and uses 2 fewer of the lines on SD bus 36 than does SD card 30. In other words, SD card 30 has two extra metal pads that are not present on MMC card 32. Specifically, one extra metal pad is added near the beveled corner of SD card 30, while another extra pad is added on the other side of the 7 metal pads. VSD card 34 has the same arrangement of the 9 metal pads as SD card 30, and can communicate over SD bus 36 with SD host 38 using the standard SD interface and protocol.

Figure 4:
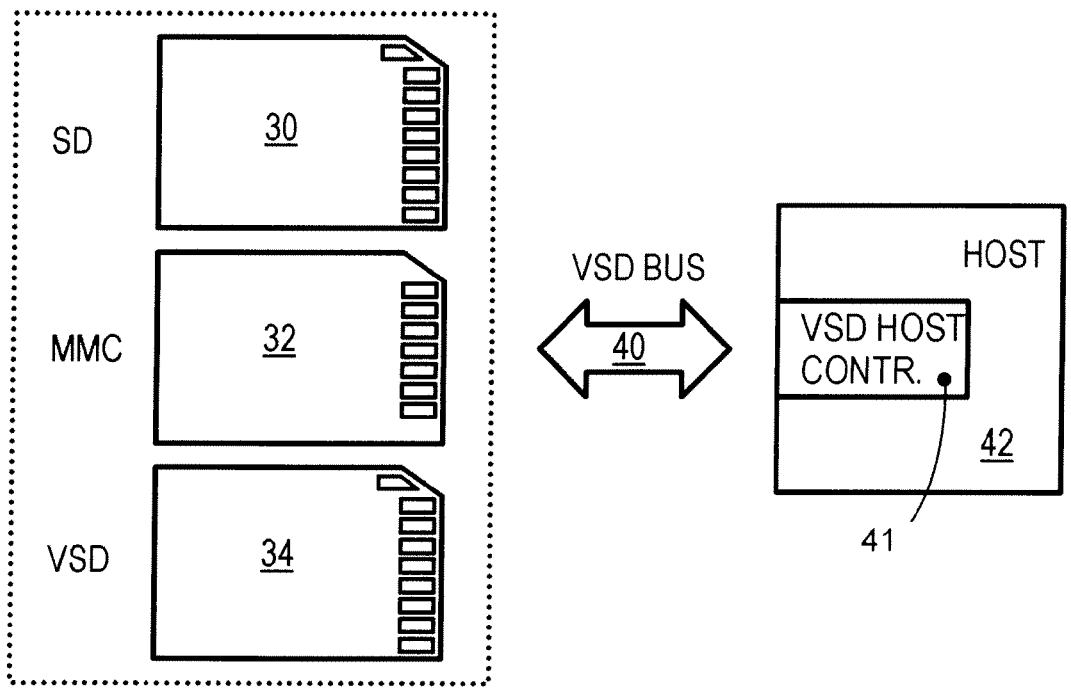
FIG. 4 shows an extended VSD host accepting a MMC card, a SD card, or a VSD card.

FIG. 4 shows an extended VSD host 42 accepting MMC card 32, SD card 30, or VSD card 34. Extended VSD host 42 is a VSD host that can detect and accept SD card 30, MMC card 32, or VSD card 34. When MMC card 32 is inserted, extended VSD host 42 uses 7 pins of a VSD bus 40 to communicate using the MMC pins and protocol. When SD card 30 is inserted, extended VSD host 42 uses 9 pins of VSD bus 40 to communicate using the SD pins and protocol.

When VSD card 34 is inserted, a VSD host controller 41 on extended VSD host 42 detects a VSD card and configures VSD card 34 to operate in extended mode using a high-speed serial-bus standard such as USB over VSD bus 40. Higher-bandwidth data transfers can then occur over VSD bus 40 using one of the serial-bus standards, such as USB, IEEE 1394, SATA, or PCI-Express.

VSD card 34 has the same arrangement of the 9 metal pads as SD card 30, but contains an internal controller (not shown) that can couple an internal serial-bus controller to the metal pads rather than the normal SD controller. For example, a USB controller inside VSD card 34 can be coupled to some of the metal pads when VSD card 34 is operating in extended VSD mode.

Figure 5:
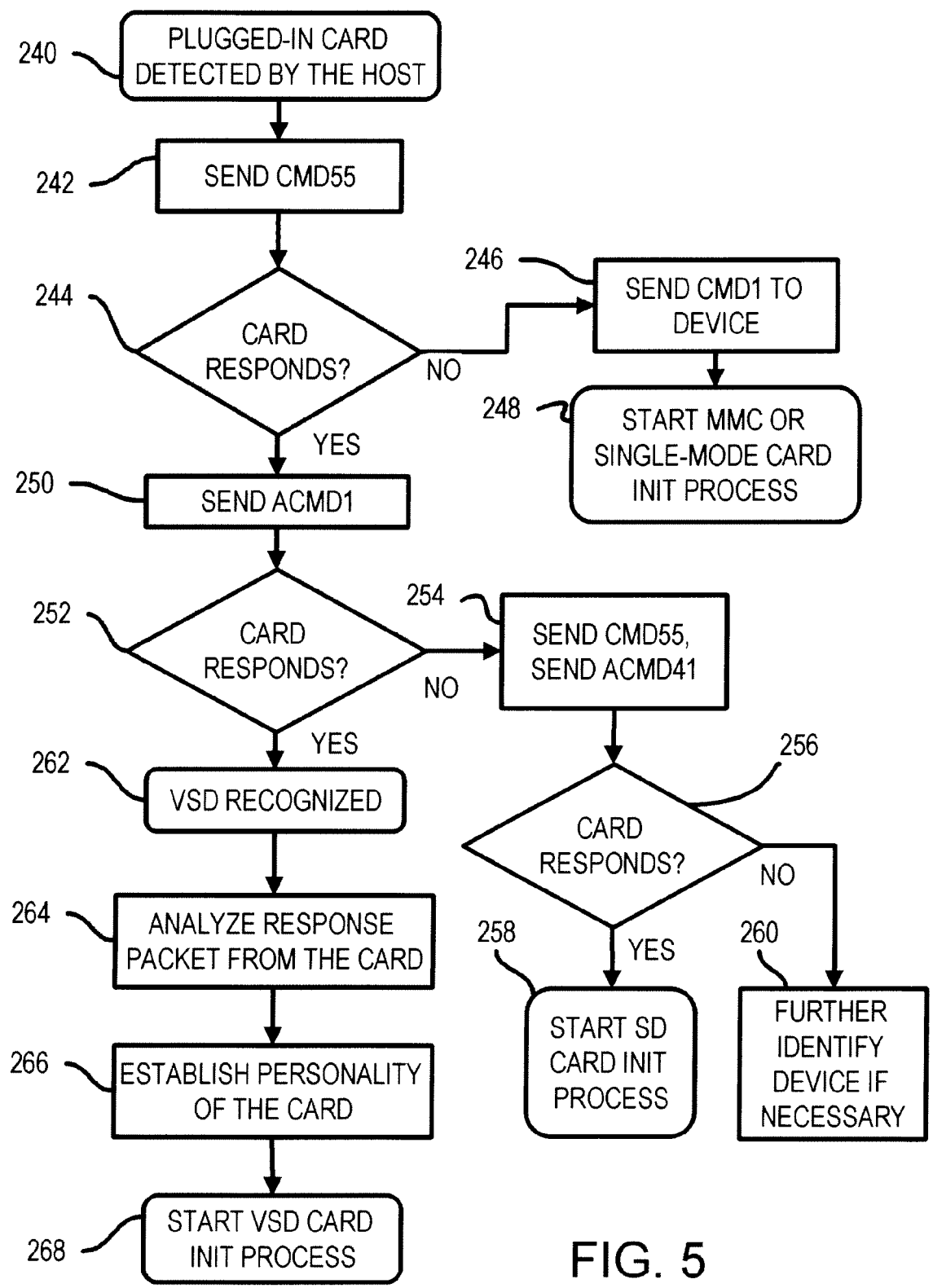
FIG. 5 is a flowchart of an extended VSD card-detection routine executed by a VSD host.

FIG. 5 is a flowchart of an extended VSD card-detection routine executed by a VSD host. The host, such as a host personal computer (PC) detects when a card is inserted into a slot, step 240, such as by detecting the card-detect (CD) pin that is pulled high by a resistor on the SD or VSD card or by detecting a switch actuation by a mechanical feature on the card. The VSD host sends a sequence of commands to the inserted card that includes a CMD55 command, step 242. If the card does not respond properly to the CMD55 command, step 244, then the card could be an MMC card, or a single-mode card, but not a SD or a VSD card. A sequence of commands is then sent to the card, step 246, including the CMD1 command. If card responds properly to the CMD1 command, then the card is an MMC card. The MMC card is then initialized by a sequence of commands, such as the host reading configuration registers on the MMC card, step 248. The host uses the 7 pins shared with MMC to communicate with the MMC card. If card dose not respond properly, the host may try to communicate with the card by switching to a different mode.

If the inserted card responds to the CMD 55 command, step 244, then the card may be a VSD card or a SD card. Further commands are sent to the card including the advanced VSD command ACMD1, step 250. If the card does not respond properly to the ACMD1, step 252, then the card cannot be a VSD card. The command sequence starts over again, re-sending the CMD55 command and later the ACMD41 command, step 254. ACMD1 is a specially-defined advanced command that only a VSD card responds to in the expected manner. For example, a VSD card could respond with a unique code used only for VSD.

If the card responds properly to the ACMD55 and ACMD41 commands, step 256, then the card is an SD card. The SD card is then initialized by a sequence of commands, such as the host reading configuration registers on the SD card, step 258. The host uses the 9-pin SD interface to communicate with the SD card. The host can use one data line or up to four data lines in the SD interface for communication. Data stored on the SD card can be encrypted using higher-level security protocols.

If the card does not respond properly to the ACMD55 and ACMD41 commands, step 256, then the card is another type of card. Further identification of the card type may be performed, step 260, or the card-detection routine can fail.

If the card responds properly to the ACMD1, step 252, then the card is a VSD card, step 262. The extended host can analyze responses from the card from this and other commands, step 264, to establish the personality and capabilities of the VSD card, step 266.

The VSD card is then initialized by a sequence of commands, such as the host reading configuration registers on the SD card, step 268. One of the extended serial-bus protocol processors is activated and connected to some of the 9 metal pads of the VSD bus to allow for extended-mode data transfers.

Figure 6:
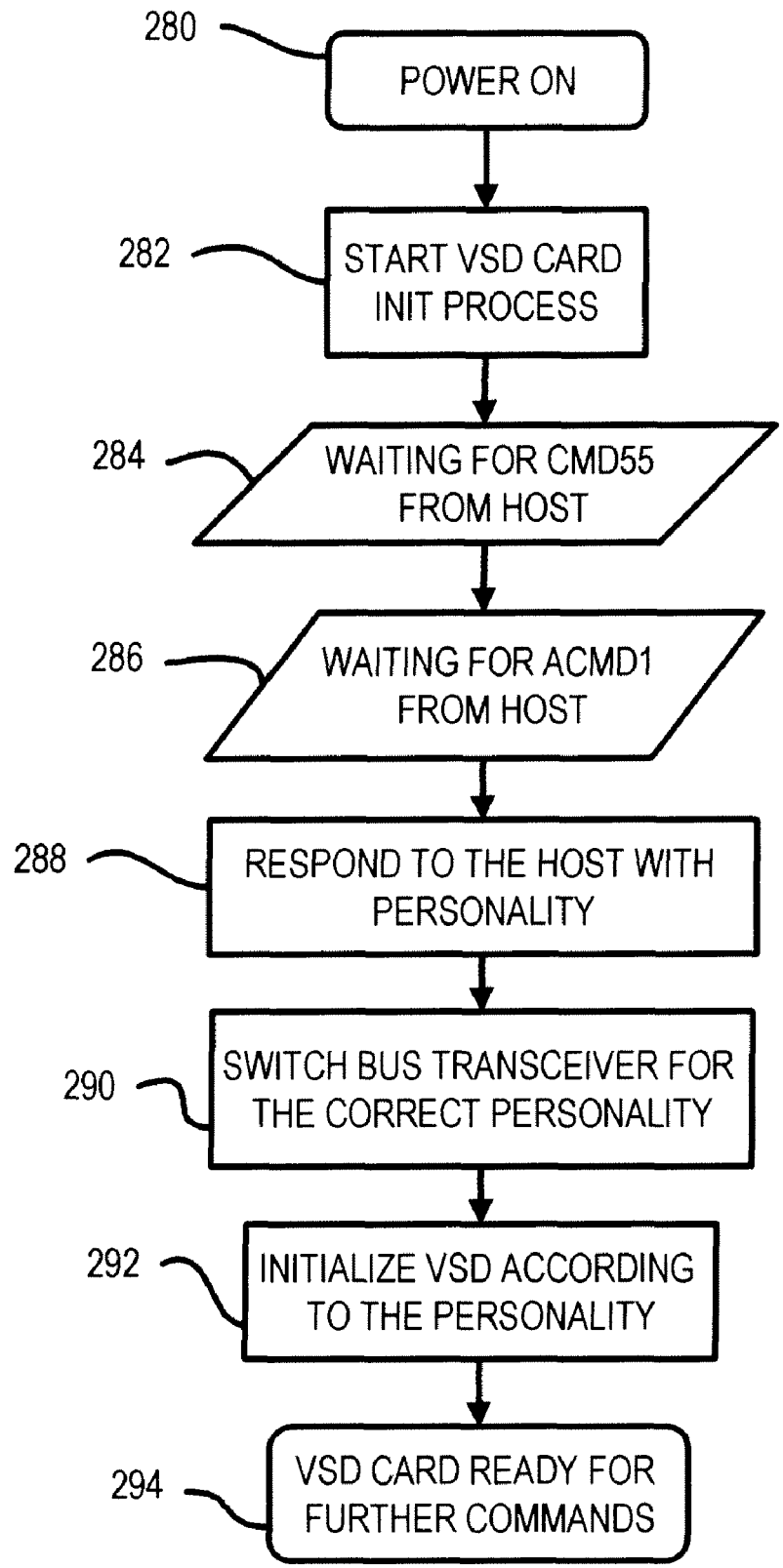
FIG. 6 is a flowchart of a VSD detection-response routine executed by a VSD card.

FIG. 6 is a flowchart of a VSD detection-response routine executed by a VSD card. The VSD card obtains power from the metal contact pads when inserted into the host slot and powers up, step 280. A card-initialization routine is started, step 282, which may include various internal self-checks. A controller inside the VSD card executes these routines, activates the external interface, and then waits for commands from the host. If it is a single-mode card, then the card waits for the host to switch to the same mode to communicate. If it is not a single-mode card, then it waits for the CMD55 command from the host.

When a CMD55 is received from the host, step 284, then the VSD controller waits for the ACMD1 from the host, step 286. The VSD card responds to the ACMD1 from the VSD host by listing the available extended-serial-bus protocols that the card supports, step 288. The host chooses one of the available protocols that the host also supports. The card changes its bus transceivers to connect one of the extended serial-bus protocol processors to some of the 9 SD pins, step 290. For example, USB may be supported.

The host sends a command to the VSD card indicating which protocol to use, step 292. The VSD card then initializes the selected protocol processor and couples it to the appropriate pins on the VSD bus. The VSD card is then ready to receive further commands from the host, step 294.

Figure 7:
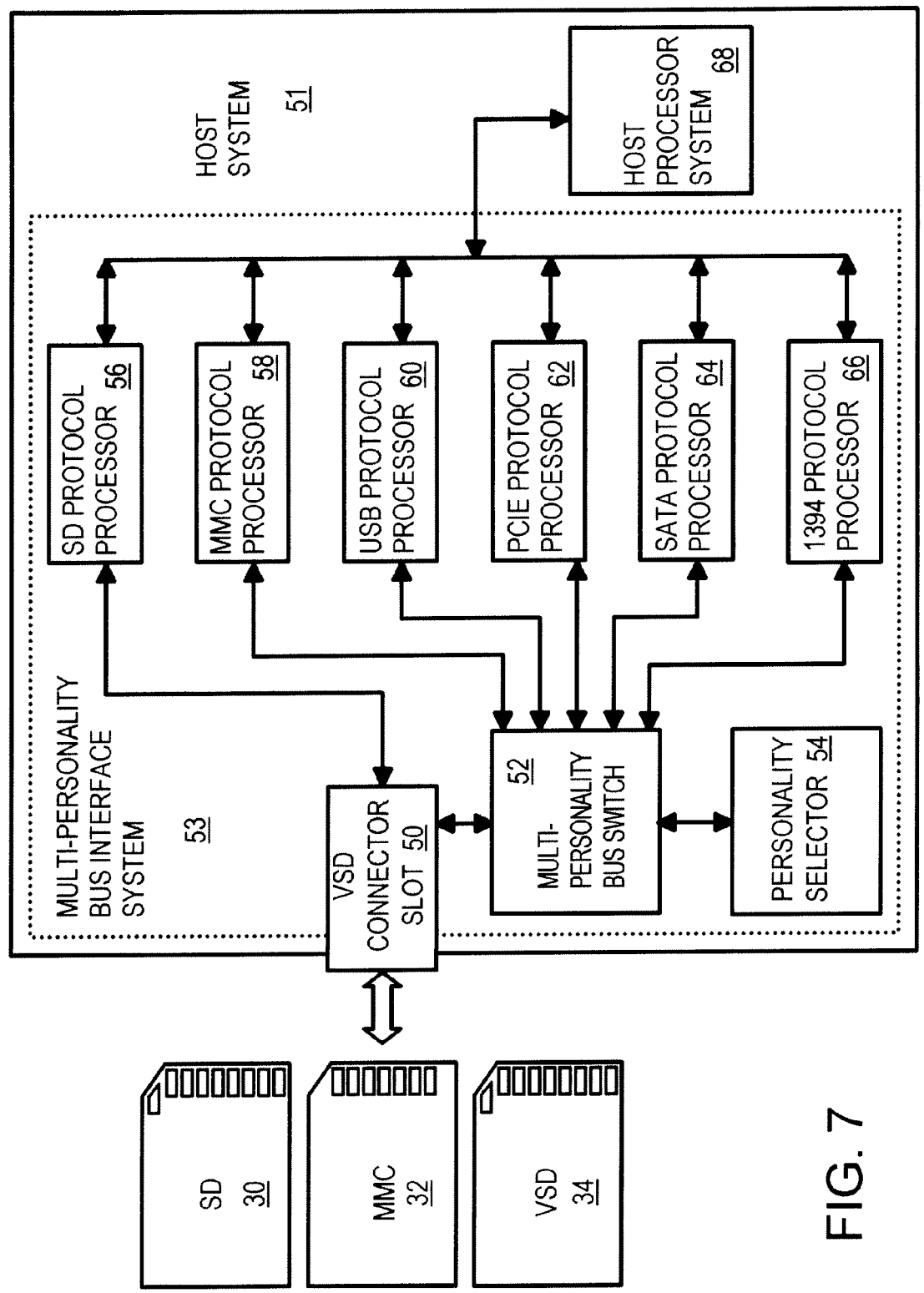
FIG. 7 is a block diagram of a host with an SD connector slot that supports extended-mode communication.
Figure 8:
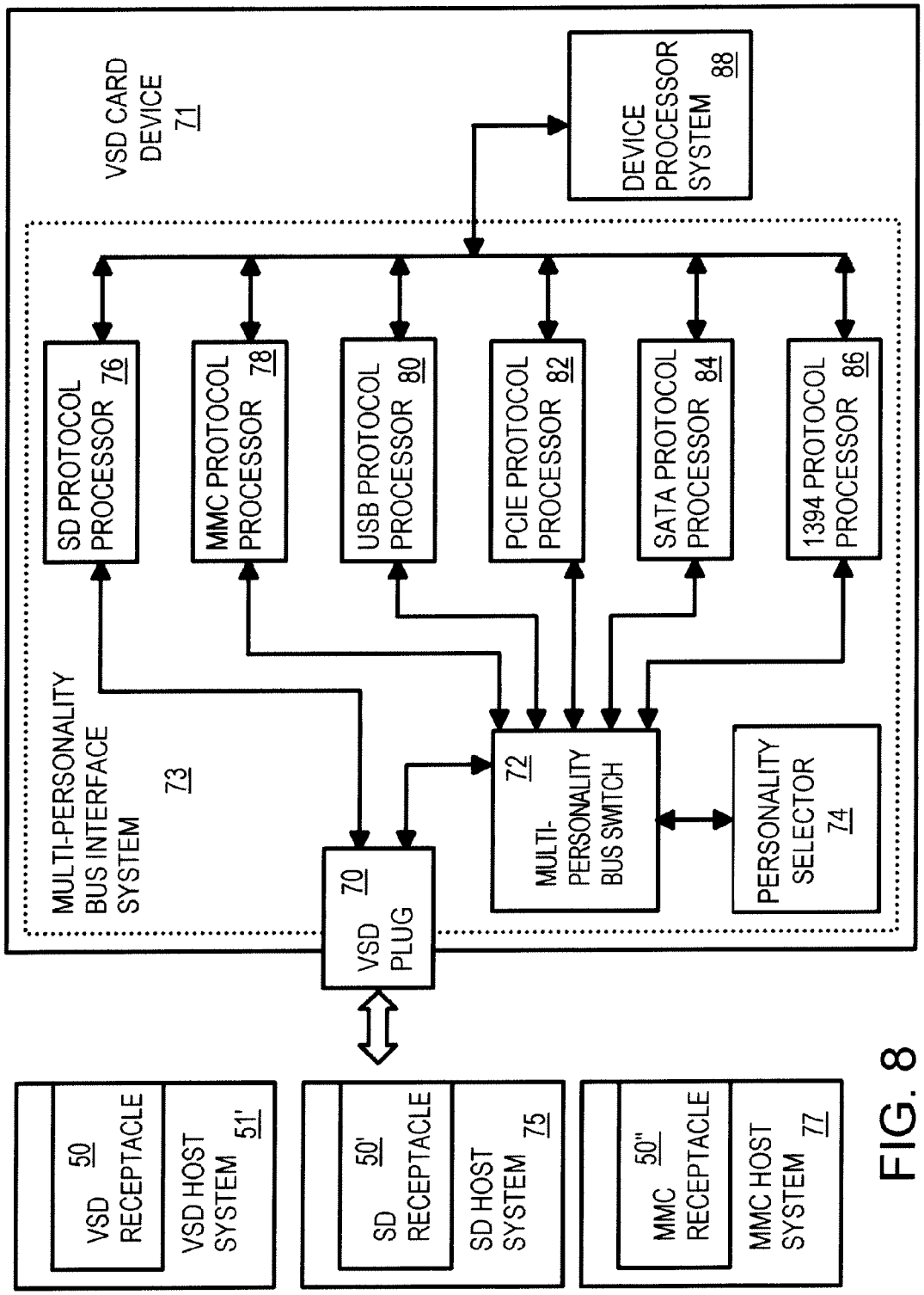
FIG. 8 is a block diagram of a VSD card device with an SD connector that supports VSD extended-mode communication.

System Block Diagrams—FIGS. 7-8

FIG. 7 is a block diagram of a host system 51 with an VSD connector slot 50 that supports extended-mode communication. SD card 30, MMC card 32, or VSD card 34 could be plugged into VSD connector slot 50 of host 51. Each card can operate in its own standard mode.

Host 51 has processor system 68 for executing programs including card-management and bus-scheduling programs. Multi-personality bus interface system 53 processes data from a host processor system 68 using various protocols. An SD protocol processor 56 processes data using the SD protocol, and inputs and outputs data on the SD data lines in VSD connector slot 50. Other protocols communicate with VSD connector slot 50 through a multi-personality bus switch 52, which selects the appropriate protocol processor.

The contact pins in VSD connector slot 50 connect to multi-personality bus switch 52 as well as to SD protocol processor 56. Transceivers in multi-personality bus switch 52 buffer data to and from the transmit and receive pairs of differential data lines in the metal contacts for extended protocols such as PCI-Express, Firewire IEEE 1394, Serial-Attached SCSI, and SATA, and for the older MultiMediaCard.

When an initialization routine executed by processor system 68 determines that inserted card is an MMC card, an MMC protocol processor 58 is activated to communicate with MMC card 32 inserted into VSD connector slot 50, while SD protocol processor 56 is disabled. A personality selector 54 configures multi-personality bus switch 52 to connect VSD connector slot 50 to MMC protocol processor 58 when processor system 68 determines that the inserted card is an MMC card. When the inserted card is SD card 30, SD protocol processor 56 continues to communicate with the card after initialization is complete.

When the initialization routine executed by host processor system 68 determines that inserted card is VSD card 34, SD protocol processor 56 continues to communicate with VSD card 34 until the capabilities of VSD card 34 are determined. Then, one of the higher-speed serial-bus protocols is selected for use. For example, when host processor system 68 determines that VSD card 34 supports PCI-Express, personality selector 54 configures multi-personality bus switch 52 to connect VSD connector slot 50 to PCI-Express protocol processor 62. Then host processor system 68 communicates with PCI-Express protocol processor 62 instead of SD protocol processor 56 when PCIE extended mode is activated.

When the initialization routine executed by host processor system 68 determines that the inserted card is VSD card 34, and supports USB, personality selector 54 configures multi-personality bus switch 52 to connect VSD connector slot 50 to USB protocol processor 60. Then host processor system 68 communicates with USB protocol processor 60 instead of SD protocol processor 56 when USB extended mode is activated.

When the initialization routine executed by processor system 68 determines that the inserted card is VSD card 34 that supports SATA, personality selector 54 configures multi-personality bus switch 52 to connect VSD connector slot 50 to SATA protocol processor 64. Then host processor system 68 communicates with SATA protocol processor 64 instead of SD protocol processor 56 when SATA extended mode is activated.

When the initialization routine executed by host processor system 68 determines that the inserted card is VSD card 34 that supports Firewire, personality selector 54 configures multi-personality bus switch 52 to connect VSD connector slot 50 to IEEE 1394 protocol processor 66. Then host processor system 68 communicates with IEEE 1394 protocol processor 66 instead of SD protocol processor 56 when IEEE 1394 extended mode is activated.

VSD card 34 may support more than one extended protocol. Then host processor system 68 can select from among the supported protocols. For example, host processor system 68 may select the fastest available protocol. Note also that host system 51 may not support all protocols shown in FIG. 7, but may only support a subset of the depicted protocols.

FIG. 8 is a block diagram of a VSD card device 71 with an SD connector that supports VSD extended-mode communication. In one embodiment, VSD card device 71 could be VSD card 34 of FIG. 7. In another embodiment, VSD card 34 could have only a subset of all the protocol processors that are included in VSD card device 71. Likewise, VSD host system 51' could be the same as host system 51 of FIG. 7, or could have only a subset of all the protocol processors that are included in host system 51 of FIG. 7.

VSD plug 70 of VSD card device 71 could be plugged into VSD receptacle 50 of VSD host 51'. VSD plug 70 of VSD card device 71 could also be plugged into SD receptacle 50' of SD host system 75, which does not support VSD mode, or VSD plug 70 of VSD card device 71 could be plugged into MMC receptacle 50" of MMC host system 77, which does not support VSD mode, but does support MMC or SPI mode.

VSD card device 71 has device processor system 88 for executing programs including card-initialization and bus-response programs. Multi-personality bus interface system 73 processes data from device processor system 88 using various protocols. SD protocol processor 76 processes data using the SD protocol, and inputs and outputs data on the SD data lines in VSD plug 70. Other protocol processors communicate with VSD plug 70 through multi-personality bus switch 72, which selects one protocol processor.

The contact pins in VSD plug 70 connect to multi-personality bus switch 72 as well as to SD protocol processor 76. Transceivers in multi-personality bus switch 72 buffer data to and from the transmit and receive pairs of differential data lines in the metal contacts for extended protocols such as PCI-Express, Firewire IEEE 1394, Serial-Attached SCSI, and SATA, and for the older MMC.

When an initialization routine executed by processor system 88 is commanded to use MMC-compatible SPI mode, when the host is MMC host system 77, MMC protocol processor 78 is activated to communicate with MMC host system 77 connected to VSD plug 70, while SD protocol processor 76 is disabled. Personality selector 74 configures multi-personality bus switch 72 to connect VSD plug 70 to MMC protocol processor 78 when device processor system 88 is commanded to use MMC-compatible mode. When the host is SD host 51, SD protocol processor 76 continues to communicate with SD host system 75 after initialization is complete.

When the host initialization routine determines that both VSD card device 71 and VSD host 51' can support VSD mode, VSD host 51' sends a command through SD protocol processor 76 to device processor system 88 to switch to VSD mode. Then one of the higher-speed serial-bus protocols is selected for use. For example, when processor system 88 is commanded to use PCI-Express, personality selector 74 configures multi-personality bus switch 72 to connect VSD plug 70 to PCI-Express protocol processor 82. Then processor system 88 communicates with PCI-Express protocol processor 82 instead of SD protocol processor 76 when PCIE extended mode is activated.

When the host initialization routine determines that the inserted card supports VSD with USB, device processor system 88 is commanded to switch to USB mode. Personality selector 74 configures multi-personality bus switch 72 to connect VSD plug 70 to USB protocol processor 80. Then processor system 88 communicates with USB protocol processor 80 instead of SD protocol processor 76 when USB extended mode is activated.

When the host initialization routine determines that the inserted card supports VSD with SATA, device processor system 88 is commanded to switch to SATA mode. Personality selector 74 configures multi-personality bus switch 72 to connect VSD plug 70 to SATA protocol processor 84. Then device processor system 88 communicates with SATA protocol processor 84 instead of SD protocol processor 76 when SATA extended mode is activated.

when the host initialization routine determines that the inserted card supports VSD with Firewire, device processor system 88 is commanded to switch to Firewire mode. Personality selector 74 configures multi-personality bus switch 72 to connect VSD plug 70 to IEEE 1394 protocol processor 86. Then processor system 88 communicates with IEEE 1394 protocol processor 86 instead of SD protocol processor 76 when IEEE 1394 extended mode is activated.

Note that VSD card device 71 may not support all protocols shown in FIG. 8. In some embodiments, VSD card device 71 may only support a subset of the depicted protocols.

Figure 9:
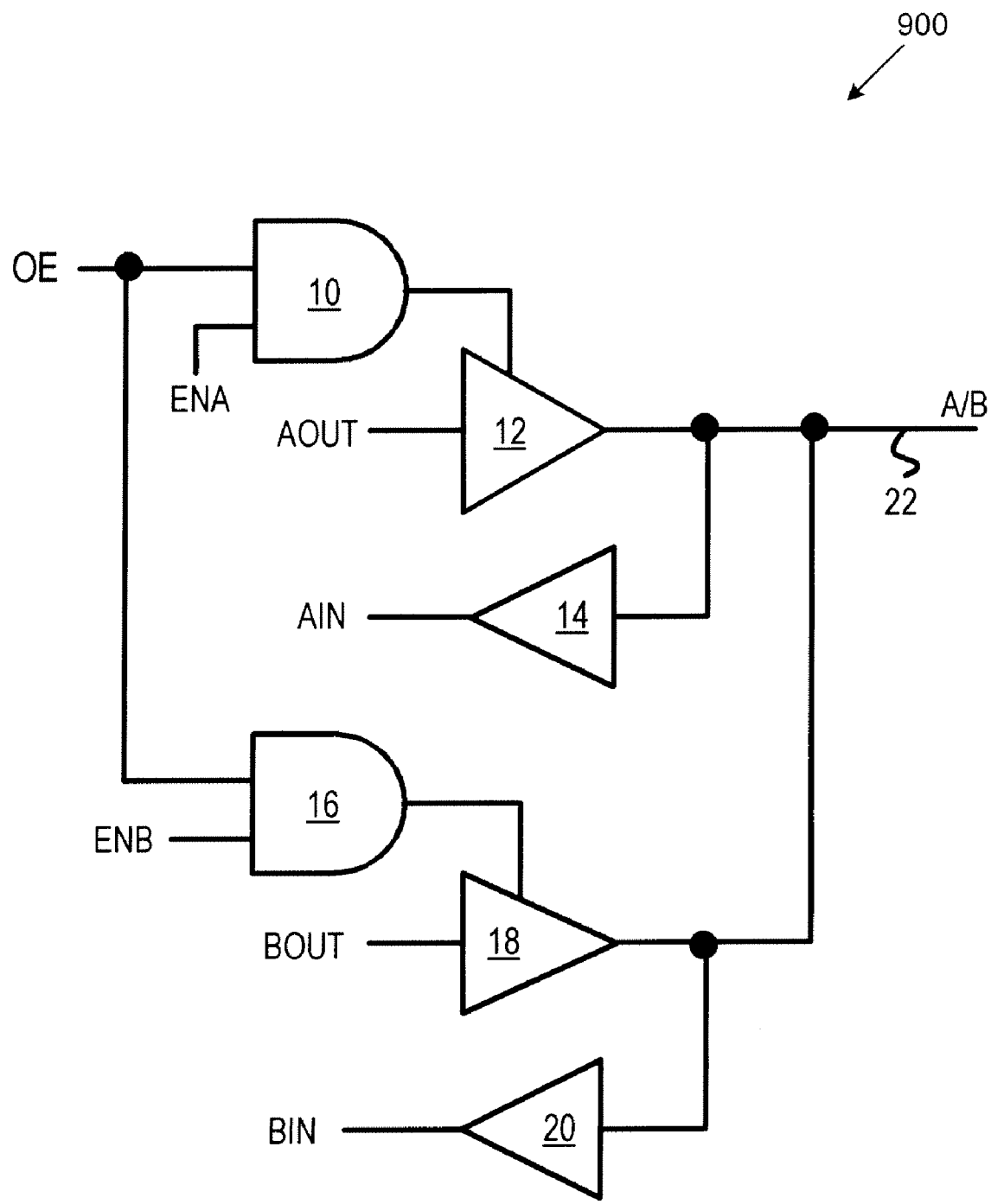
FIG. 9 is a functional diagram of a signal multiplexer.

FIG. 9 is a functional diagram of a signal multiplexer 900 that can be incorporated into host system 51 of FIG. 7 or VSD card device 71 of FIG. 8. Signal multiplexer 900 can be used, for example, to provide contacts (pins) in VSD connector slot 50 of host system 51 or in VSD plug 70 in VSD card device 71 that have multiple functions (described in greater detail below with respect to FIGS. 10, 11, 12A, and 12B).

Signal multiplexer 900 is configured to provide/receive either signal AIN/AOUT for an A interface (not shown) or signals BIN/BOUT for a B interface (not shown). For example, A interface and B interface could be an SD protocol processor and a VSD protocol processor, respectively, in a VSD card or host system. A multiplexed line 22 could then be a connector to one of the metal contact pads in the card, or could be an internal bus line.

An input buffer 14 buffers line 22 to generate signal AIN for the A interface, while an input buffer 20 buffers line 22 to generate signal BIN for the B interface. When line 22 is an output or is an I/O line that is being driven, an output-enable signal OE is activated high. When the A interface is active, a signal ENA is logic high and an AND gate 10 drives a logic high to enable an output buffer 12, which drives a signal AOUT onto line 22. When the B interface is active, a signal ENB is logic high and an AND gate 16 drives a logic high to enable an output buffer 18, which drives a signal BOUT onto line 22.

Note that additional interfaces C, D, etc. (i.e., other communications protocol processors) can mux to the same line 22 by adding additional AND gates and input and output buffers. Moreover, additional enable signals ENC, END, etc. can be generated. The interfaces can be for MMC, USB, SATA, IEEE 1394, PCIE, and SD.

Interface Pin Tables

FIG. 10 is a table showing signal multiplexing with a 9-pin SD connector. Power (VDD) is provided on pin 4, while grounds are provided on pins 3 and 6. A clock is input to the card on pin 5, while pin 7 is a serial data I/O DAT0 for all interfaces.

Pin 2 is a bi-directional command CMD line for MMC, SD, and USB interfaces, and is a data input DIN for SPI (Serial Peripheral Interface), which is a full-duplex, synchronous, serial data link standard across many microprocessors, microcontrollers, and peripherals. SPI enables communication between microprocessors and peripherals and/or inter-processor communication. SPI mode is a subset of the MultiMediaCard and SD protocols. The SPI interface has a chip-select on pin 1 and a data-output to the host on pin 7. The SPI and MMC interfaces do not use pins 8, 9.

For the SD interface, up to four data lines may be used at a time, although only one data line may be used during a particular communication session (e.g., during card initialization). Data line DAT0 is on pin 7, DAT1 on pin 8, DAT2 on pin 9, and DAT3 on pin 1.

When VSD mode is active and the USB protocol is selected, serial USB data is transferred bidirectionally over the USB differential data lines D+, D−. The CMD, CLK, and DAT0 lines can still be connected to the SD processor, allowing 1-bit SD communication when USB capability is not available.

When VSD mode is active and the PCIE protocol is selected, serial PCI data is transferred over two pairs of differential data lines (i.e., transmit lines Tp0 and Tn0, and lines and receive lines Rp0 and Rn0). Transmit lines Tp0, Tn0 on pins 2, 1 are output by the card and received by the host, while receive lines Rp0, Rn0 on pins 8, 9 are output by the host and received by the card.

When VSD mode is active and the SATA protocol is selected, serial ATA data is transferred over two pairs of differential data lines (i.e., "A" lines A+ and A−, and "B" lines B+ and B−). A lines A+ and A− on pins 2 and 1, respectively, are output by the host and received by the card, while B lines B+ and B− on pins 8 and 9, respectively, are output by the card and received by the host. SD communication stops while SATA is being used.

When VSD mode is active and the Firewire protocol is selected, serial IEEE-1394 data is transferred over two pairs of differential data lines (i.e., transmit-pair-A lines TPA and TPA* and transmit-pair-B lines TPB and TPB*). Transmit-pair-A lines TPA and TPA* on pins 2 and 1, respectively, are output by the card and received by the host, while transmit-pair-B lines TPB and TPB* on pins 8 and 9, respectively, are output by the host and received by the card. SD communication stops while IEEE-1394 is being used.

FIG. 11 is a table showing signal multiplexing with a 7-pin MMC connector. Older legacy hosts may support only MMC. USB, SD, SPI, and MMC are supported, but not other interfaces such as SATA, IEEE-1394, and PCIE. Although there are 6 MMC signal pins, the MMC interface has an extra, unused pin, for a 7-pin physical interface. Power (VDD) is provided on pin 4, while grounds are provided on pins 3 and 6. A clock is input to the card on line 5, while pin 7 is a serial data I/O DAT0 for all interfaces.

Pin 2 is a bi-directional command CMD line for MMC, SD, and USB interfaces, and is a data input DIN for SPI. The SPI interface has a chip-select on pin 1 and a data-output to the host on pin 7. The SD interface uses data line DAT0 on pin 7.

When VSD mode is active and the USB protocol selected, serial USB data is transferred bidirectionally over the USB differential data lines D+, D− on pins 2, 1. Thus USB can still be supported when only 7 pins are available.

FIG. 12A is a table showing pin multiplexing for an extended 13-pin connector. Pins 10-13 are used as data pins DAT4:7 on an extended SD interface, and can also be reserved for the serial-bus interfaces for the version 4.0 MMC specification FIG. 12B is a table showing pin multiplexing for a 10-pin Memory Stick system. Rather than use SD, the extended interface could be designed for other card base-protocols, such as Memory Stick (MS). Memory Stick has a 10-pin connector, with power on pins 3 and 9, and ground on pins 1 and 10. Pin 8 is a system clock (SCLK) input, while pin 2 is a bus-state (BS) input. Data is carried bidirectionally by DAT0 on pin 4, while pin 6 is an insertion (INS) pin that can be pulled up by a resistor on the MS card to indicate that the card has been inserted.

Pins 5 and 7 are reserved for MS, but are used by an extension known as MS Pro Duo. MS Pro Duo has a 4-bit data bus, DAT0:3, using pins 4, 3, 5, 7, respectively. One less power is available for MS Pro Duo, since pin 3 is used for DAT1 rather than VCC.

For a MS-USB extended mode, pins 4, 3 carry the USB differential data pair D+, D−. Other pins can be used for MS or MS Pro Duo signaling. For PCIE extended mode, pins 4, 3 carry the PCI transmit differential data pair T+, T−, while pins 7, 5 carry the PCI receive differential data pair, R+, R−. Likewise, for SATA extended mode, pins 4, 3 carry the SATA transmit differential data pair T+, T−, while pins 7, 5 carry the SATA receive differential data pair, R+, R−. For IEEE 1394 extended mode, pins 4, 3 carry the 1394 A differential data pair TPA, TPA*, while pins 7, 5 carry the 1394 B differential data pair, TPB, TPB*.

Note that for the physical construction of the cards themselves, a variety of materials may be used for the card substrate, circuit boards, metal contacts, card case, etc. Plastic cases can have a variety of shapes and may partially or fully cover different parts of the circuit board and connector, and can form part of the connector itself. Various shapes and cutouts can be substituted. Pins can refer to flat metal leads or other contactor shapes rather than pointed spikes.

Many extended protocols such as PCI-Express, USB, serial ATA, Serial Attached SCSI, or Firewire IEEE 1394 can be used as a second interface. The host may support various serial-bus interfaces, and can first test for USB operation, then IEEE 1394, then SATA, then SA SCSI, etc, and later switch to a higher-speed interface such as PCI-Express.

Note further that while an SD card has generally been described for exemplary purposes, the SD card could be replaced by a Memory Stick (MS) card, a MS Pro card, a MS Duo card, a Mini-SD card, a reduced-size MMC card, etc. A hardware switch could replace some of the card-detection routine steps. For example, a notch could be added to the card housing to interface with a switch in the card socket.

In addition, a special LED can be designed to inform the user which electrical interface is currently in use. For example, if the standard SD interface is in use, then this LED can be turned on. Otherwise, this LED is off. If more than 2 modes exists, then a multi-color LED can be used to specify the mode, such as green for PCI-Express and yellow for USB.

Also, different power-supply voltages may be used. USB and SATA may use a 5-volt supply, while SD and MMC use a 3.3-volt supply, and PCIE uses a 1.5-volt supply. A 3.3-volt supply could be applied to the VCC pin, and an internal voltage converter on the VSD card could generate other voltages, such as 5 volts using a charge pump, and 1.5 volts using a DC-to-DC converter.

PCI Express system bus management functions can be achieved by the two differential pairs of the VSD/PCIE interface. Clock signals such as REFCLK+ and REFCLK− are signals that can be added using additional pads. The side band signals of PCIE can be added, such as CPPE#, CPUSB#, CLKREQ#, PERST#, WAKE#, +3.3AUX, SMBDATA, SMBCLK, etc. with additional pads. Also, the approach of using modified PCIE signals can be applied to the design of serially-buffered memory modules of DRAMs.

In light of the above description of a multi-personality flash memory card, it can be seen that the limitations of conventional card-based communications protocols (e.g., SD, MMC, CF) can be overcome by incorporating a second standard communications protocol capability, such as USB, SATA, Firewire, or PCI-Express. However, according to another embodiment, a flash memory card and/or a host controller can include card-specific differential data transfer logic for enabling differential data transfer between the flash memory card and a host device.

Figure 13A:
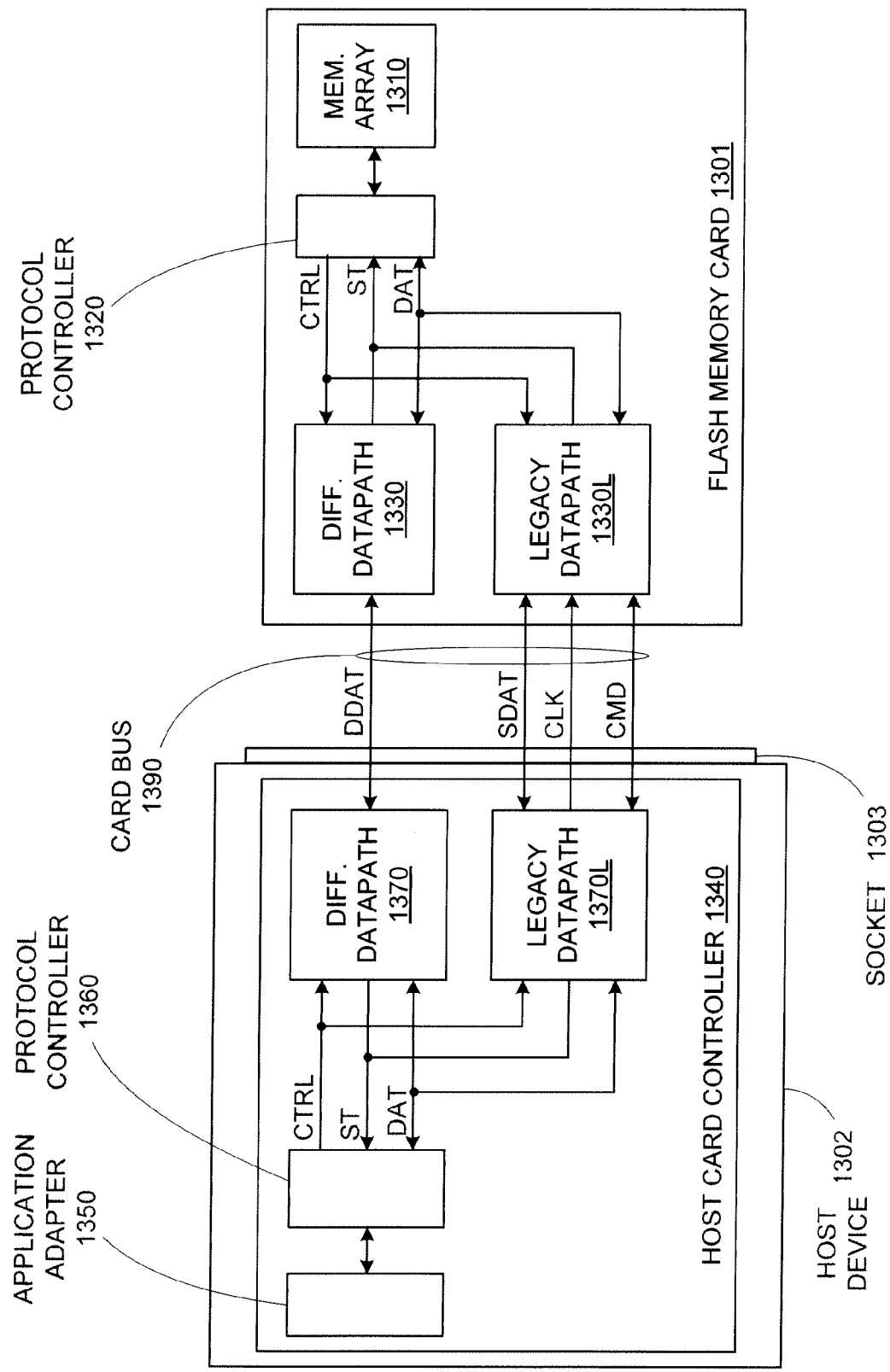
FIG. 13A is a schematic diagram of embodiments of a host device and flash memory card with differential data transfer capabilities.

For example, FIG. 13A shows embodiments of a host device 1302 and a flash memory card 1301 that can communicate via a differential signal DDAT. Host device 1302 can be any type of electronic device that interfaces with a flash memory card, such as a digital camera, an MP3 player, or a voice recorder, among others. Flash memory card 1301 can comprise any type of flash memory card, including an MMC card, an SD card, a Memory Stick, or a CF card. Note that while communication between flash memory card 1301 and host device 1302 occurs when flash memory card 1301 is inserted into a socket 1303 of host device 1302 (or when flash memory card 1301 is coupled to socket 1303 by an adapter or extension), for explanatory purposes and clarity, flash memory card 1301 is depicted apart from host device 1302.

Flash memory card 1301 includes a memory array 1310, a protocol controller 1320, a differential datapath 1330, and an optional legacy datapath 1330L. Host device 1302 includes a host card controller 1340 that includes an application adapter 1350, a protocol controller 1360, a differential datapath 1370, and an optional legacy datapath 1370L. Differential datapaths 1330 and 1370 can provide the same basic functionality for flash memory card 1301 and host card controller 1340, respectively, by converting card-specific protocol signals (e.g., control signals CTRL, status signals ST, and data signals DAT from protocol controllers 1320 and 1360), into differential signal(s) DDAT that can be transmitted between flash memory card 1301 and host card controller 1340 across a card bus 1390.

Figure 1A:
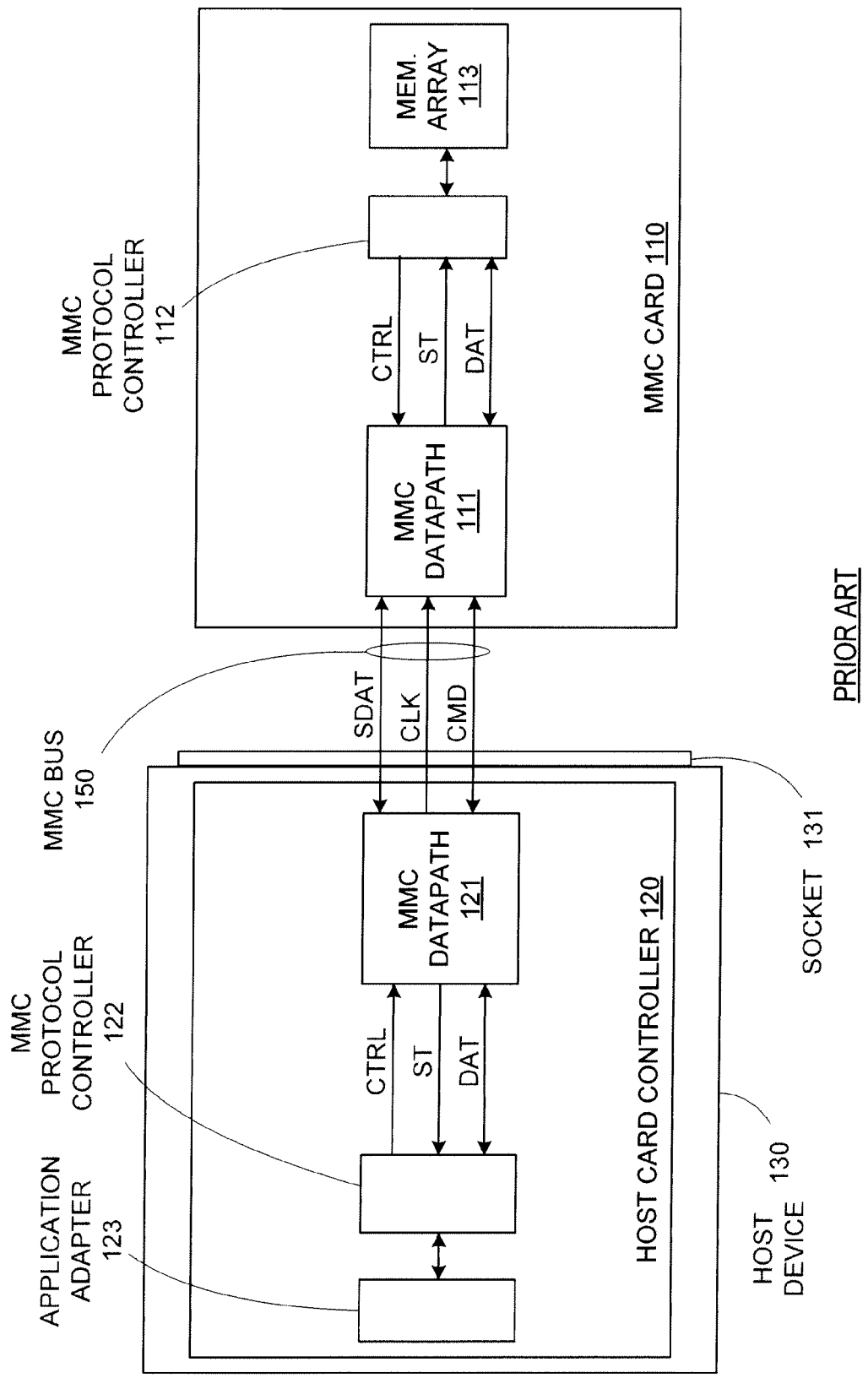
FIG. 1A is a block diagram of a conventional communications interface between an MMC card and a host device.

Like conventional MMC datapaths 111 and 121 shown FIG. 1A, differential datapaths 1330 and 1370 can provide serial-to-parallel conversion for incoming data and parallel-to-serial conversion for outgoing data, frame detection to ensure proper read/write operations of memory array 113, and error checking (typically CRC checking of signals SDAT and CMD). However, differential datapaths 1330 and 1370 also provide differential data encoding and decoding to enable differential data communications between flash memory card 1301 and host card controller 1340.

Meanwhile, protocol controllers 1320 and 1360 in flash memory card 1301 and host card controller 1340, respectively, can operate in much the same manner as MMC protocol controllers 112 and 122, respectively, shown in FIG. 1A. Specifically, protocol controller 1320 in flash memory card 1301 performs appropriate actions (e.g., read/write operations to memory array 1330 and processing of checksum errors detected by differential datapath 1310) in response to incoming status signals ST and data signals DAT, and generating appropriate outgoing control signals CTRL and data signals DAT (e.g., read/write pass/fail indicators and data) upon completion of those actions.

Similarly, protocol controller 1360 in host card controller 1340 generates appropriate outgoing control signals CTRL and data signals DAT (e.g., read/write command and memory addresses) in response to instructions from application adapter 1350, and performs appropriate actions (e.g., providing read data or write operation confirmation) in response to incoming status signals ST and data signals DAT. Note that data signal DAT and status signal ST can be provided directly to host device 1302 by protocol controller 1360, or can be converted from the card-specific communications protocol to a host-specific communications protocol by application adapter 1350. Just as described with respect to application adapter 123 in FIG. 1A, application adapter 1350 acts as a bridge between host-specific communications and card-specific communications.

Communications between flash memory card 1301 and host device 1302 are initiated by the insertion of flash memory card 1301 into socket 1303, which activates flash memory card 1301. Application adapter 1350 can then apply a command from host device 1302 (e.g., a read or write command) to protocol controller 1360, which then provides an appropriate control signal CTRL and data signal DAT to differential datapath 1370. Differential datapath 1370 then converts signals CTRL and DAT into a differential signal DDAT that is transmitted to differential data path 1330 of flash memory card 1301. Differential data path 1330 decodes data signal DDAT into a status signal ST and data signal DAT, which cause protocol controller 1320 to perform the requested operation on memory array 1310 (unless differential datapath 1330 indicates a failed transmission). Protocol controller 1320 returns a response and any associated data from memory array 1310 to differential datapath 1330 via a control signal CTRL and a data signal DAT. Differential datapath 1330 converts signals CTRL and DAT into a differential signal DDAT that is transmitted back to differential datapath 1370 in host card controller 1340. Differential datapath 1370 then decodes the incoming differential data signal DDAT into a status signal ST and a data signal DAT, which can then be converted to appropriate host-specific signals for use by host device 1302.

Figure 13B:
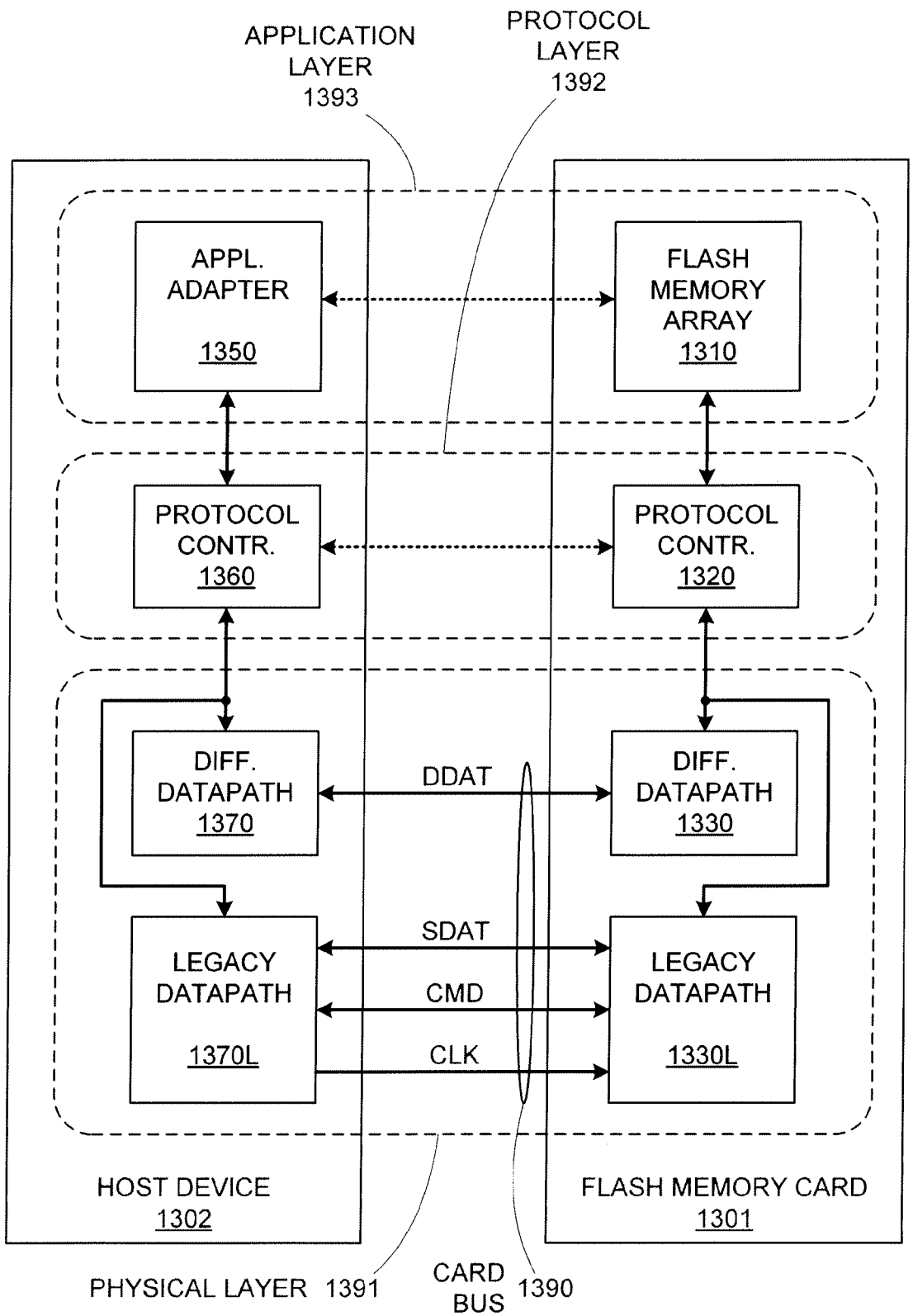
FIG. 13B is an embodiment of a communication diagram for a differential data transfer-enabled host device and flash memory card.

Communications between flash memory card 1301 and host device 1302 can be thought of as a layered transaction, with information being passed across the different layers at varying levels of abstraction. For example, FIG. 13B shows an exemplary communications diagram for flash memory card 1301 and host device 1302 that indicates the various layers making of the communications stack. Protocol layer 1392 and application layer 1393 are virtual connections (indicated by the dotted arrows) between host device 1302 and flash memory card 1301. At application layer 1393, application adapter 1350 of host device 1302 accesses flash memory array 1310 of flash memory card 1310. This top-level transaction is made possible by protocol layer 1392, in which application-specific communications are translated into card-specific communications across protocol controllers 1320 and 1360. The protocol layer communications are implemented in a physical layer 1301, in which actual signals (i.e., differential signal DDAT and optional legacy signals SDAT, CMD, and CLK) are transmitted between host device 1302 and flash memory card 1301 over card bus 1390.

Note that differential data transfer capabilities for host device 1302 and flash memory card 1301 can be implemented in physical layer 1391, thereby allowing any card protocol to be used in the implementation of protocol controllers 1360 and 1320, respectively. For example, in one embodiment, protocol controllers 1360 and 1320 could comprise standard MMC protocol controllers that make use of standard MMC-specific protocol signals (e.g., signals CTRL, ST, and DAT). In various other embodiments, protocol controllers 1320 and 1360 could comprise standard SD, Memory Stick, or CF protocol controllers for generating, and operating in response to, standard SD-specific, Memory Stick-specific, or CF-specific, respectively, protocol signals. The use of conventional flash memory card-specific protocol controllers can beneficially simplify the implementation of high-speed differential communications.

For example, a conventional host device configured for conventional clocked data communications with a MMC card could be reconfigured for differential data communication simply by replacing the existing the standard MMC datapath with a differential datapath (e.g., replacing MMC datapath 121 in FIG. 1A with differential datapath 1370). If the MMC datapath is implemented in firmware (or some other reprogrammable form), the change becomes as easy as updating the firmware to implement the differential datapath.

Note also that the use of a standard card-specific protocol controller (e.g., an MMC protocol controller or an SD protocol controller) can allow host card controller 1340 and/or flash memory card 1301 to selectably perform differential data transfers and clocked data transfers, depending on the characteristics of the interfacing device/card. For example, protocol controller 1360 could comprise a standard MMC protocol controller coupled to both differential datapath 1370 and legacy datapath 1370L. Legacy datapath 1370L could then be a standard MMC datapath that communicates via standard clocked command signals CMD and serial data signals SDAT. In this manner, host card controller 1340 could communicate with conventional MMC cards using conventional clocked data transfer, but could also use the higher-speed, lower-power differential data transfer when communicating with differential data-enabled MMC cards.

Similarly, protocol controller 1320 in flash memory card 1301 could comprise a conventional MMC protocol controller coupled to both differential datapath 1330 and legacy datapath 1330L, in which case legacy datapath 1330L could comprise a conventional MMC datapath. In this manner, flash memory card 1301 could communicate with conventional MMC-based host devices using standard clocked data transfer, while switching to higher-speed, lower-power differential data transfer when communicating with differential data-enabled host devices.

Figure 14A:
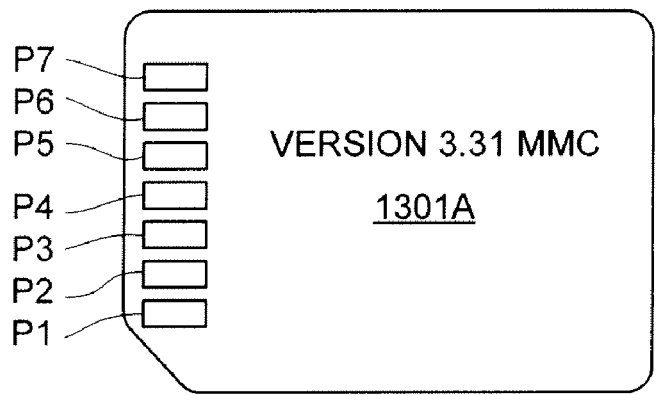
FIGS. 14A, 14B, 14C, and 14D are sample pinout diagrams for various types of flash memory cards that can incorporate differential data transfer capabilities.

FIG. 14A shows a mechanical form factor diagram for an embodiment of a version 3.31 MMC-compatible card 1301A that provides differential data transfer capabilities. A sample pin assignment for version 3.31 MMC-compatible card 1301A is listed below in Table 3.

TABLE 3

| Pin No. | Name |
|---|---|
| P1 | D− |
| P2 | CMD (OPT.) |
| P3 | VSS1 |
| P4 | VDD |

TABLE 3-continued

| Pin No. | Name |
| --- | --- |
| P5 | CLK (OPT.) |
| P6 | VSS2 |
| P7 | D+/DAT0 |

Figure 1B:
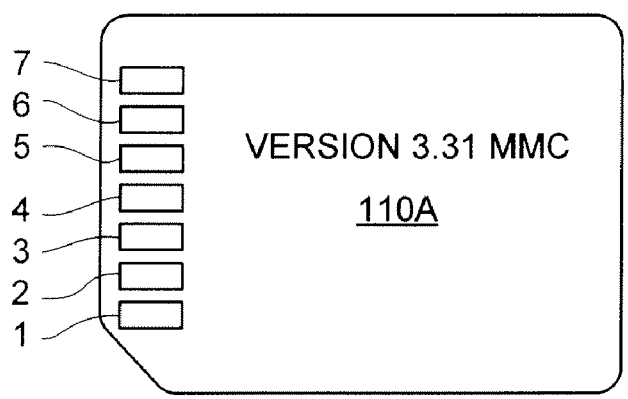
FIG. 1B is a diagram of a conventional MMC version 3.31 pin assignment.
Figure 1C:
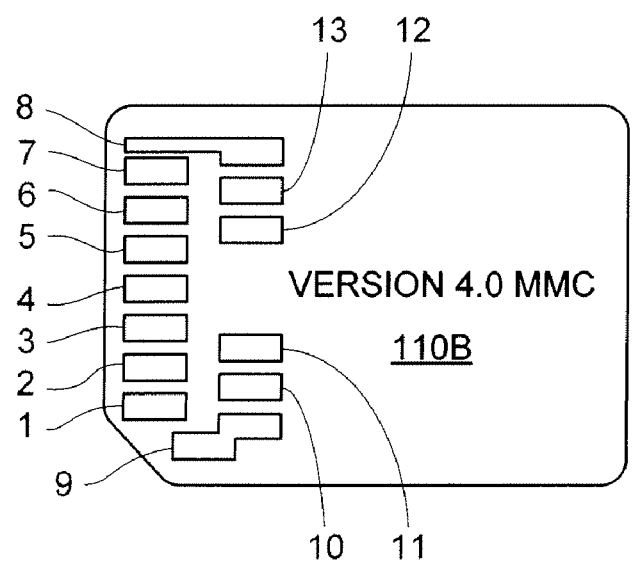
FIG. 1C is a diagram of a conventional MMC version 4.0 pin assignment.
Figure 2A:
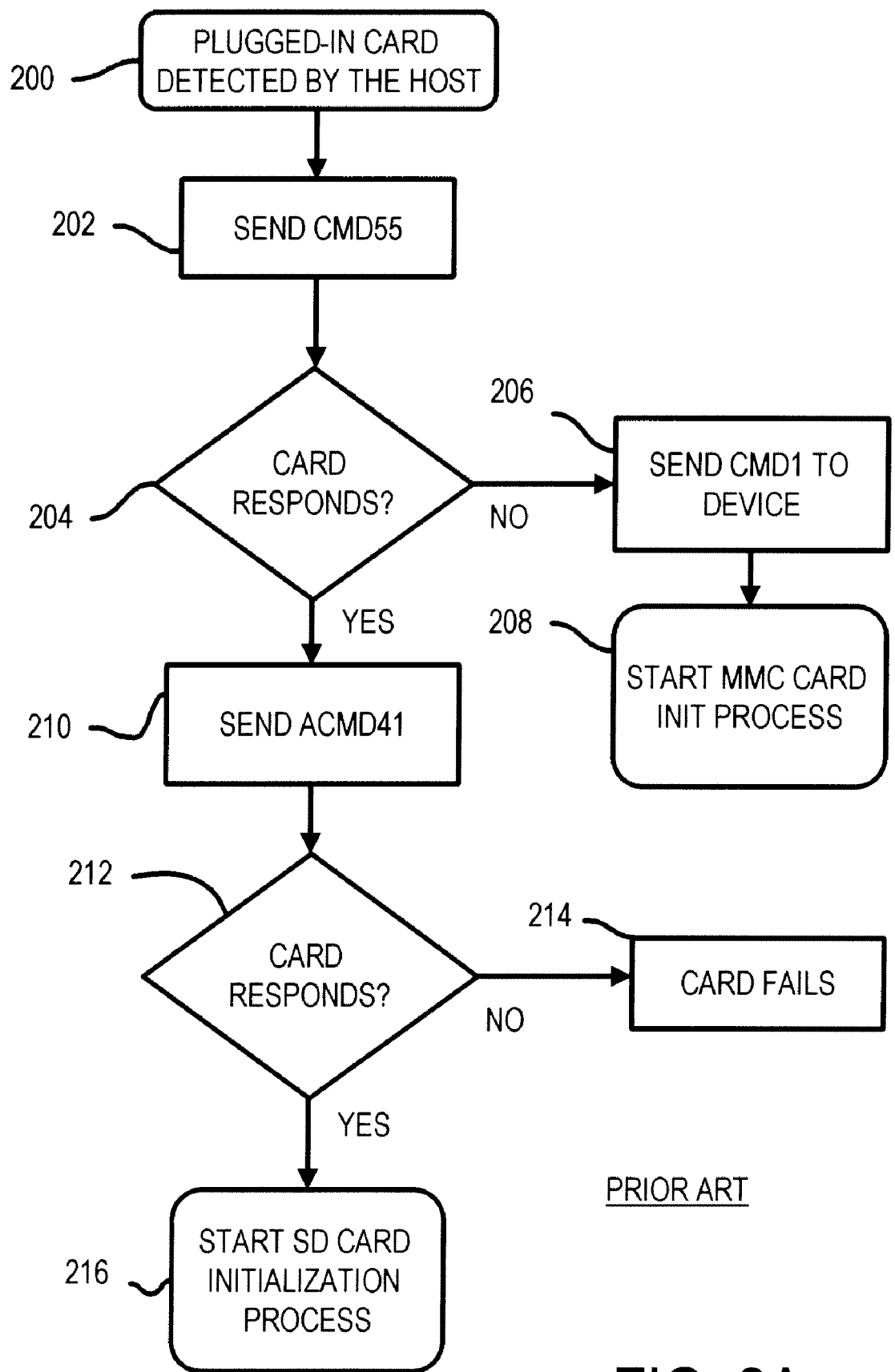
FIG. 2A shows a prior-art card-detection routine executed by a host.
Figure 2B:
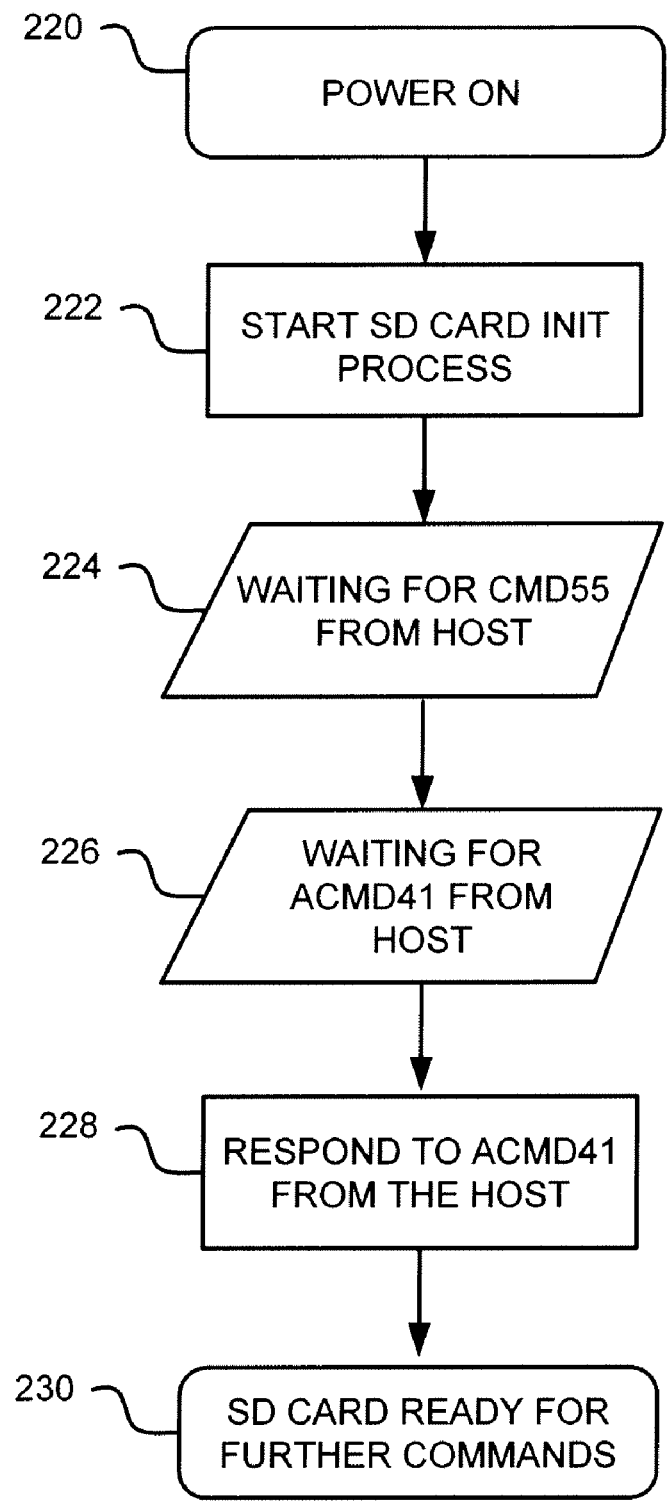
FIG. 2B is a flowchart of a prior-art detection-response routine executed by a SD card.

Card 1301A includes pins P1-P7. Just as in a conventional version 3.31 MMC card (e.g., MMC card 110A shown in FIG. 1B), pins P3, P4, and P6 are power supply pins for receiving supply voltages VSS1, VDD, and VSS2, respectively. However, rather than only using pin P7 as a data (DAT0) pin, card 1301A makes use of pins P1 and P7 to send/receive the complementary signals D− and D+, respectively, that make up a differential signal (i.e., differential signal DDAT in FIG. 13A).

If card 1301A also includes a standard MMC datapath (e.g., legacy datapath 1330L shown in FIG. 13A), pins P2, P5, and P7 can be used in the conventional manner for command signal CMD, clock signal CLK, and serial data signal DAT0 (e.g., serial data signal SDAT in FIG. 1A). Note that pin P7 would then be a dual-use pin that provides serial data signal DAT0 during clocked data transfers and differential signal component D+ during differential data transfers. In this manner, a differential data transfer-enabled MMC card can retain form factor and pinout compatibility with conventional MMC-based host devices.

Figure 14B:
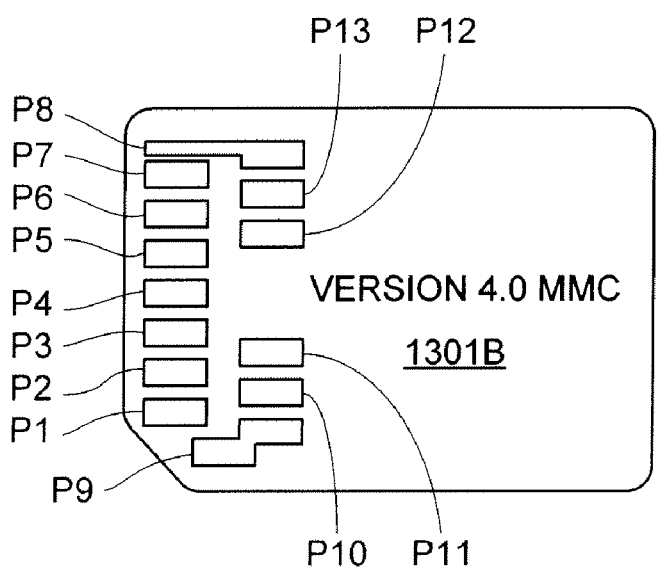

FIG. 14B shows mechanical form factor diagram for an embodiment of a version 4.0 MMC-compatible card 1301B that provides differential data transfer capabilities. An exemplary pin assignment for version 4.0 MMC-compatible card 1301B is listed below in Table 4.

TABLE 4

| Pin No. | Name |
| --- | --- |
| P1 | D−/DAT3 |
| P2 | CMD (OPT.) |
| P3 | VSS1 |
| P4 | VDD |
| P5 | CLK (OPT.) |
| P6 | VSS2 |
| P7 | D+/DAT0 |
| P8 | A+/DAT1 |
| P9 | A−/DAT2 |
| P10 | B+/DAT4 |
| P11 | B−/DAT5 |
| P12 | C+/DAT6 |
| P13 | C−/DAT7 |

Card 1301B is substantially similar to card 1301A shown in FIG. 14A, except that the additional pins P8-P13 can be used for complementary signals A+, A−, B+, B−, C+, and C−, as indicated in the pin assignment table, thereby providing three additional differential data channels (A+/A−, B+/B−, and C+/C−). Note that to provide compatibility with conventional version 4.0 MMC devices, pins P8-P13 can be dual-use pins that provide clocked serial data signals DAT1-DAT7, respectively, during clocked data transfers.

Figure 14C:
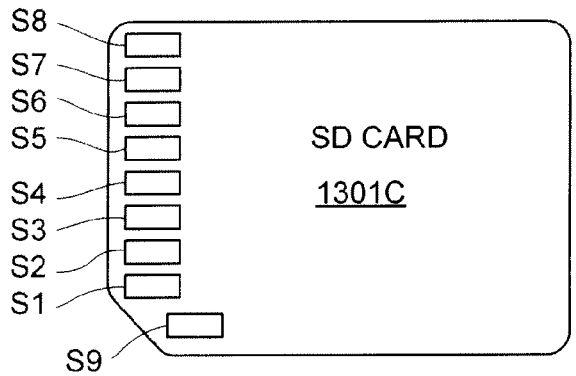

Note that similar modifications can be made to any other type of flash memory card without changing form factor or pin compatibility. For example, FIG. 14C shows a mechanical form factor diagram for an embodiment of a SD card 1301C that provides differential data transfer capabilities. A sample pin assignment for SD card 1301C is listed in Table 5, below.

TABLE 5

| Pin No. | Name |
| --- | --- |
| S1 | D−/DAT3 |
| S2 | CMD (OPT.) |
| S3 | VSS1 |
| S4 | VDD |
| S5 | CLK (OPT.) |
| S6 | VSS2 |
| S7 | D+/DAT0 |
| S8 | A+/DAT1 (OPT.) |
| S9 | A−/DAT2 (OPT.) |

Card 1301C includes pins S1-S9, of which pins P3, P4, and P6 are power supply pins for receiving supply voltages VSS1, VDD, and VSS2, respectively. Pins S1 and S7 can then be used to send/receive complementary signals D− and D+, respectively, which make up a differential signal for communications between SD card 1301C and a host device. In one embodiment, pins S8 and S9 could provide another differential data path for complementary signals A+ and A−, respectively. If card 1301C also includes a standard SD datapath (i.e., legacy datapath 1330L shown in FIG. 13A), card 1301C can receive a clock signal CLK at pin S5, while pins S7, S8, S9, and S1 can be used for clocked serial data signals DAT0, DAT1, DAT2, and DAT3, respectively (with pins S1 and S7 being dual-use pins).

Figure 14D:
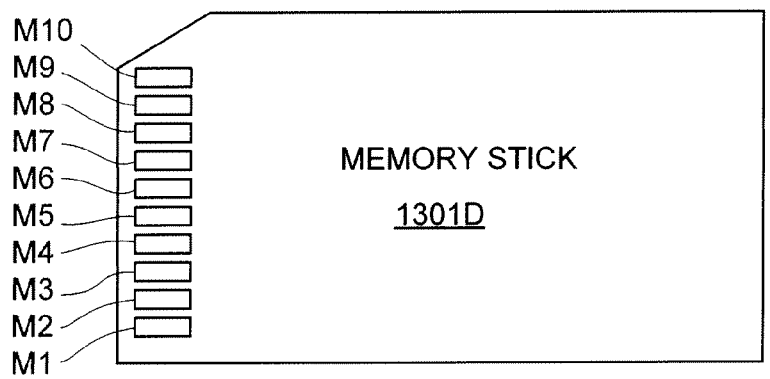

In another example, FIG. 14D shows a mechanical form factor diagram of an embodiment of a Memory Stick 1301D that provides differential data transfer capabilities. A sample pin assignment for Memory Stick 1301D is listed in Table 6, below.

TABLE 6

| Pin No. | Name |
| --- | --- |
| M1 | VSS |
| M2 | BS |
| M3 | D−/DAT1 |
| M4 | D+/DAT0 |
| M5 | A−/DAT2 |
| M6 | INS |
| M7 | A+/DAT3 |
| M8 | SCLK (OPT.) |
| M9 | VCC |
| M10 | VSS |

Memory stick 1301D includes pins M1-M10, of which pins M1, M9, and M10 are power supply fins for receiving supply voltages VSS, VCC, and VSS, respectively. Pins M2 and M6 are for bus state signals BS and insertion signals INS, respectively, that are required by the Memory Stick specification. Thus, pins M3 and M4 can be used for complementary data signals D− and D+, respectively, that make up a differential data signal for communications between Memory Stick 1301D and a host device. Optionally, pins M5 and M7 can provide another differential data communications channel for complementary data signals A− and A+, respectively. If Memory Stick 1301D includes a standard Memory Stick datapath (i.e., legacy datapath 1330L shown in FIG. 13A), Memory Stick 1301D can receive a clock signal SCLK at pin M8, while pins M4, M3, M5, and M7 can be used for clocked serial data signals DAT0, DAT1, DAT2, and DAT3, respectively (with pins M3, M4, and possibly M5 and M7 being dual-use pins).

Figure 15A:
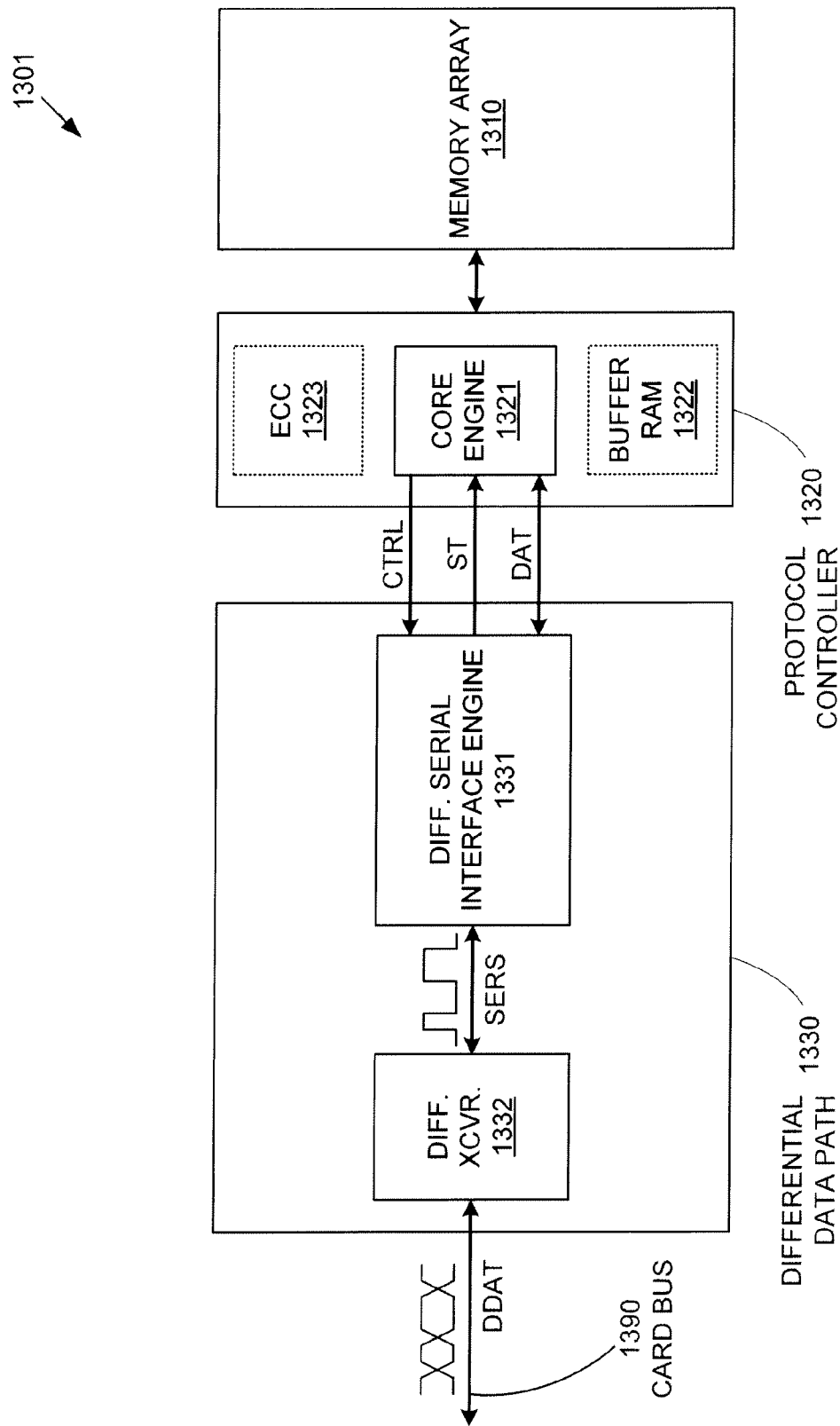
FIG. 15A is a schematic diagram of an embodiment of a differential data path for a flash memory card.

FIG. 15A shows a detailed embodiment of memory card 1301 shown in FIG. 13A. Protocol controller 1320 includes a core engine 1321, optional buffer RAM 1322, and an optional error checking circuit (ECC) 1323. Core engine 1321 controls memory array 1310 according to status signal ST and incoming data signal DAT, and generates control signal CTRL and outgoing data signal DAT (as described above with respect to FIG. 13A) in response. Buffer RAM 1322 can be included to buffer incoming and outgoing data signals DAT to compensate for slower memory access times in memory array 1310. Finally, ECC 1323 can be included in protocol controller 1320 to ensure that the signal integrity of signals CTRL, ST, and DAT are properly maintained.

In one embodiment, differential data path 1330 includes a differential serial interface engine 1331 and a differential transceiver 1332. Differential serial interface engine 1331 provides any encoding/decoding, serialization/deserialization, and packetization of signals CTRL, ST, and DAT required for proper differential signal transmission (described in greater detail below with respect to FIG. 16A). Differential serial interface engine 1331 generates/receives a "multipurpose" (data and/or command information) serial signal SERS that is converted by differential transceiver 1332 to/from differential data signal DDAT, thereby enabling differential data transfer between memory card 1301 and a differential data transfer-enabled host device.

Figure 15B:
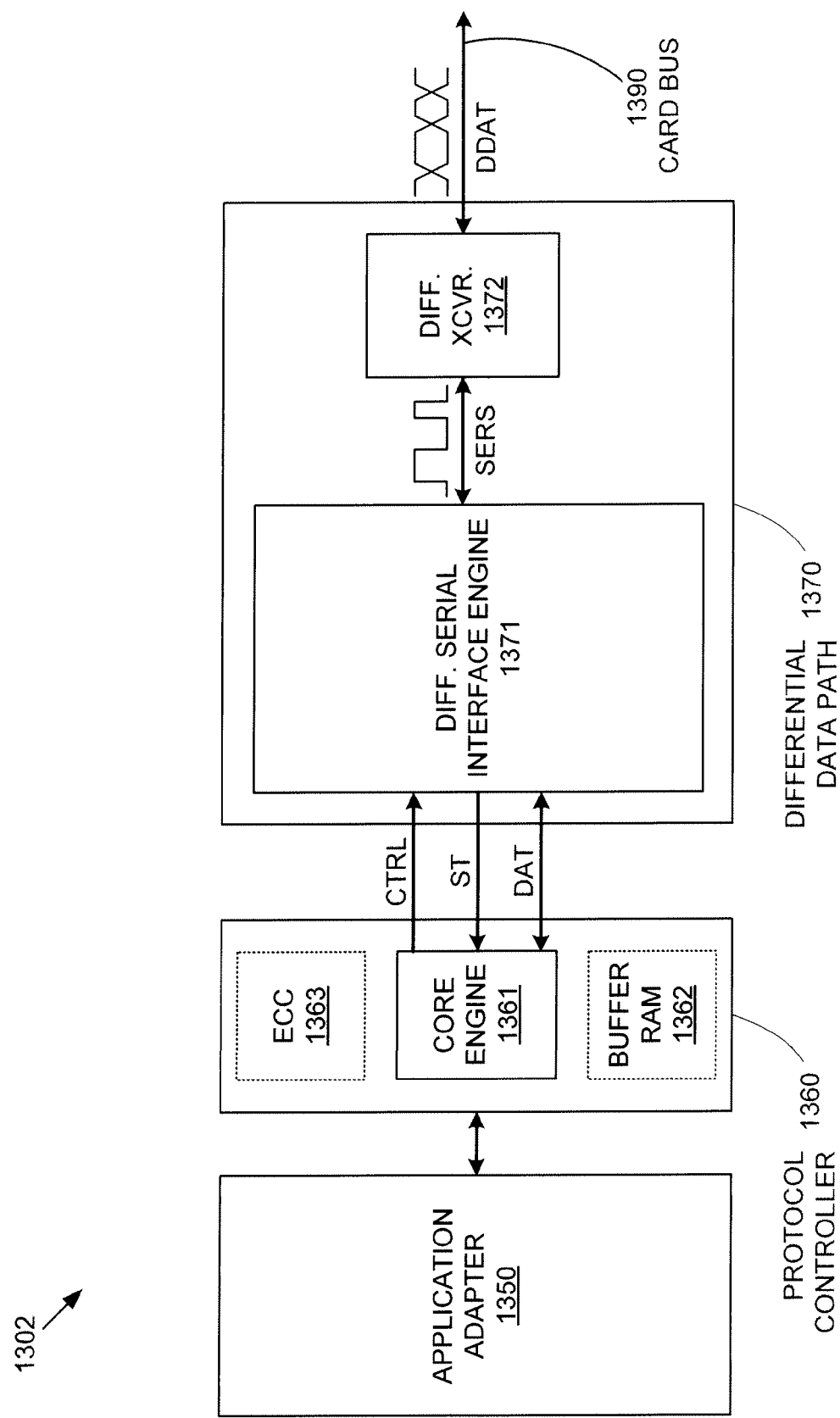
FIG. 15B is a schematic diagram of an embodiment of a differential data path for a host device.

FIG. 15B shows a detailed embodiment of host device 1302 shown in FIG. 13A that can interface with flash memory card 1301 shown in FIG. 15A. Protocol controller 1360 includes a core engine 1361, optional buffer RAM 1362, and an optional ECC 1363. In response to instructions from application adapter 1350, core engine 1361 generates appropriate outgoing control signals CTRL and data signals DAT, and processes incoming status signals ST and data signals DAT for application adapter 1350 (as described above with respect to FIG. 13A). Buffer RAM 1362 can be included to buffer incoming and outgoing data signals DAT to compensate for differences between the data bandwidth of data signal DAT and the data handling capabilities of application adapter 1350 (or the host device). Finally, ECC 1363 can be included in protocol controller 1360 to ensure that the signal integrity of signals CTRL, ST, and DAT are properly maintained.

Meanwhile, differential data path 1370 includes a differential serial interface engine 1371 and a differential transceiver 1372. Like differential serial interface engine 1331 in flash memory card 1301 (in FIG. 15A), differential serial interface engine 1371 provides any encoding/decoding, serialization/deserialization, and packetization of signals CTRL, ST, and DAT required for proper differential signal transmission (described in greater detail below with respect to FIG. 16B). Differential serial interface engine 1371 generates/receives a multipurpose serial signal SERS that is converted by differential transceiver 1372 to/from differential data signal DDAT, thereby enabling differential data transfer between host device 1302 and a differential data transfer-enabled flash memory card.

Figure 16A:
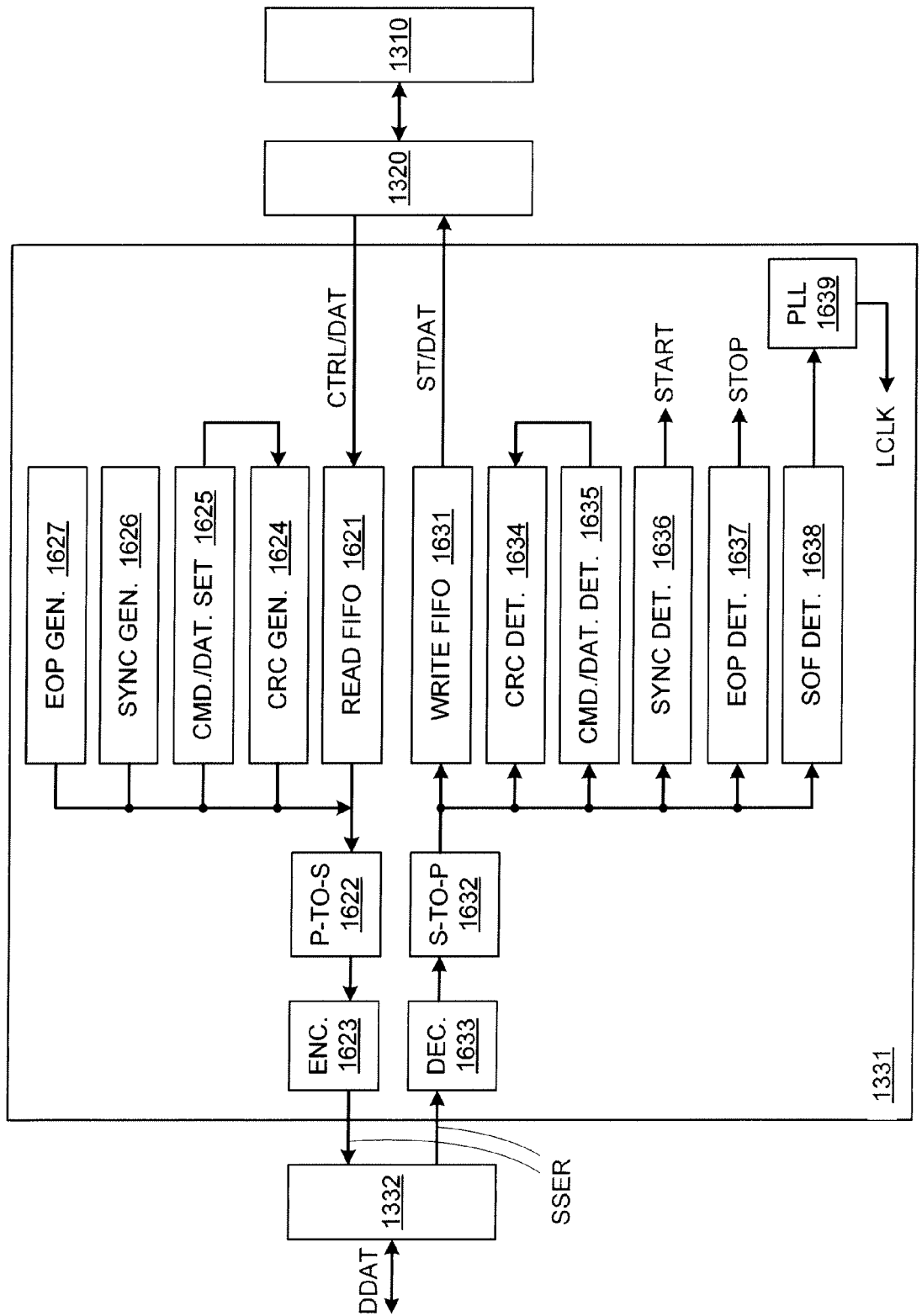
FIG. 16A is a detailed schematic diagram of an embodiment of a serial interface engine for use in generating (and decoding) serial differential data signals in a flash memory card.

FIG. 16A shows a detailed embodiment of serial interface engine 1331 shown in FIG. 15A. Serial interface engine 1331 includes a read FIFO (first-in-first-out memory) 1621, a parallel-to-serial converter 1622, an encoder 1623, a CRC generator 1624, a command/data set circuit 1625, a sync generator 1626, an EOP (end of packet) generator 1627, a write FIFO 1631, a serial-to-parallel converter 1632, a decoder 1633, a CRC detector 1634, a command/data detector 1635, a sync detector 1636, an EOP detector 1637, a SOF (start of frame) detector 1638, and a phase-locked-loop (PLL) 1639. Serial interface engine 1331 shown in FIG. 16A enables serial differential data transfer via data packetizing to eliminate the need for clocked data transfer. Note that the underlying card protocol (e.g., MMC protocol) may itself include some form of packetization, in which case SIE 1331 can simply perform its packetization over the underlying packetized data.

Decoder 1633 is coupled to receive serial signal SSER from differential transceiver 1332 and decodes the data according to a predetermined encoding protocol. For example, in one embodiment, NZRI (non-return to zero inverted) encoding can be used to enable the differential data transfer, while bit stuffing can be incorporated to facilitate frame detection. In such circumstances, decoder 1633 can include NRZI decoding and bit unstuffing logic. Decoder 1633 can also include clock recovery logic and an elastic store buffer to compensate for localized timing problems (e.g., jitter).

The decoded signal generated by decoder 1633 is parallelized by serial-to-parallel converter 1632 for more efficient processing. The data is then sent to write FIFO 1631, CRC detector 1634, command/data detector 1635, sync detector 1636, EOP detector 1637, and SOF detector 1638. Sync detector 1636 identifies synchronization fields in the incoming signals, and upon detection of a synchronization field, initiates packet reception by providing a signal START to write FIFO 1631, CRC detector 1634, command/data detector 1635, EOP detector 1637, and SOF detector 1638.

In response to signal START, write FIFO 1631 begins storing the contents of the incoming signal (from serial-to-parallel converter 1632), while CRC detector 1634 performs a CRC check on the incoming data. If different CRC formats are used for command and data signals (e.g., CRC7 for commands and CRC16 for data), command/data detector 1635 determines whether the incoming data blocks are command block or data blocks, and instructs CRC detector accordingly. Note that various error handling procedures can be performed if the CRC check fails, including terminating the process, or requesting re-transmission of the command/data.

Meanwhile, SOF detector 1638 detects the SOF fields in the incoming data and provides the resulting frame timing frequency to PLL 1639, which in turn generates a local clock signal LCLK in response (SOF fields are inserted at regular intervals into the incoming signal by the host device). As a result, local clock signal LCLK is synchronized with the original system clock in the host device used in the original encoding of the incoming signals and can be used as a recovery clock for the incoming signals.

Finally, when EOP detector 1637 detects an EOP field, EOP detector 1637 ends the packet reception by issuing a signal STOP to write FIFO 1631, CRC detector 1634, command/data detector 1635, EOP detector 1637, and SOF detector 1638. Protocol controller 1320 then reads the packet data (which can be either a status (ST) or data (DAT) signal) from write FIFO 1631, after which the next packet reception can begin. In this manner, write FIFO 1631, CRC detector 1634, command/data detector 1635, EOP detector 1637, and SOF detector 1638 can act as de-packetizing logic for serial interface engine 1331.

The control signal CTRL and/or data signal DAT returned by protocol controller 1320 is then stored into read FIFO 1621. Meanwhile, CRC generator 1624 and sync generator 1626 generate a CRC field and a synchronization field, respectively, for the outgoing signal. Note that command/data set circuit 1625 can provide an appropriate indicator to CRC generator 1624 if different CRC formats are used for command and data packets. The contents of read FIFO 1621 are then passed to parallel-to-serial converter 1622 for serialization, with EOP generator 1627 issuing an EOP field at the end of each packet. In this manner, read FIFO 1621, CRC generator 1624, command/data set circuit 1625, sync generator 1626, and EOP generator 1627 can act as packetizing logic for serial interface engine 1331.

Parallel-to-serial converter 1622 then converts the incoming parallel data into a serial bitstream that is then encoded by encoder 1623. Just as described with respect to decoder 1633, encoder 1623 applies the predetermined encoding protocol to the bitstream from parallel-to-serial converter 1622 to generate an outgoing serial signal SSER, which is then converted to a differential data signal DDAT by differential transceiver 1332. For example, in one embodiment, encoder 1623 can include bit stuffing and NRZI encoding logic.

Figure 16B:
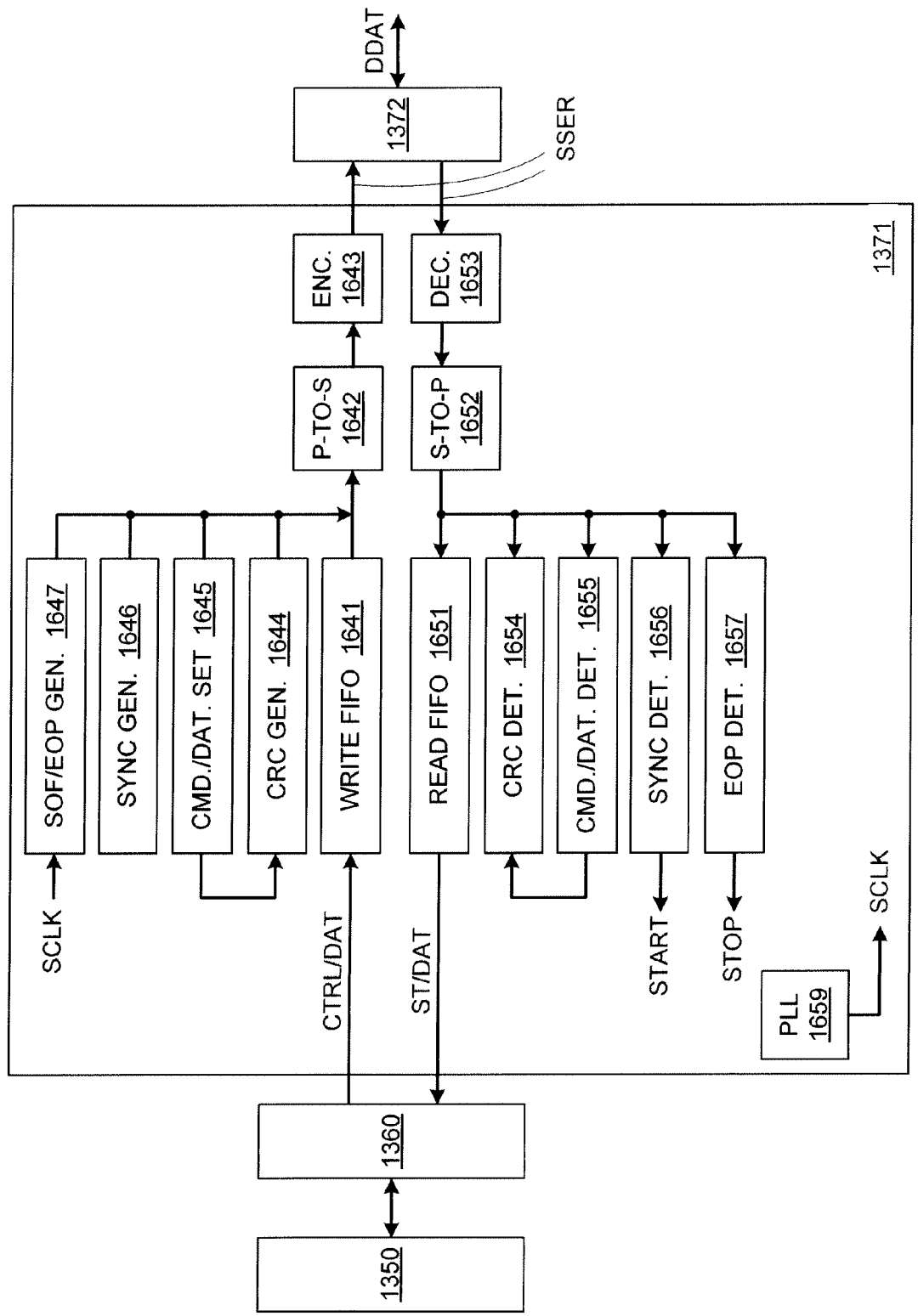
FIG. 16B is a detailed schematic diagram of an embodiment of a serial interface engine for use in generating (and decoding) serial differential data signals in a host device.

FIG. 16B shows a detailed embodiment of serial interface engine 1371 shown in FIG. 15B. Serial interface engine 1371 includes a write FIFO 1641, a parallel-to-serial converter 1642, an encoder 1643, a CRC generator 1644, a command/data set circuit 1645, a sync generator 1646, an SOF/EOP generator 1647, a read FIFO 1651, a serial-to-parallel converter 1652, a decoder 1653, a CRC detector 1654, a command/data detector 1655, a sync detector 1656, an EOP detector 1657, and a PLL 1659. Like serial interface engine 1331 shown in FIG. 16A, serial interface engine 1371 shown in FIG. 16B enables serial differential data transfer via data packetizing to eliminate the need for data clocking.

A communication with a flash memory card begins with control signal CTRL and/or data signal DAT from protocol controller 1360 being stored into write FIFO 1641. Meanwhile, CRC generator 1644 and sync generator 1646 generate a CRC field and a synchronization field, respectively, for the outgoing signal. Note that command/data set circuit 1645 can provide an appropriate indicator to CRC generator 1644 if different CRC formats are used for command and data packets.

The contents of write FIFO 1641 are then passed to parallel-to-serial converter 1642 for serialization, with SOF/EOP generator 1647 issuing an SOF field at the start of each frame and an EOP field at the end of each packet. Note that a system clock signal SCLK generated by PLL 1659 is used to provide the frame timing for SOF/EOP generator 1647; specifically, system clock signal SCLK is used by SOF/EOP generator 1647 to provide SOF fields at appropriate intervals. In this manner, write FIFO 1641, CRC generator 1644, command/data set circuit 1645, sync generator 1646, and SOF/EOP generator 1647 can act as packetizing logic for serial interface engine 1371.

Parallel-to-serial converter 1642 then converts the incoming parallel data into a serial bitstream that is encoded by encoder 1623. Encoder 1623 applies the predetermined encoding protocol (e.g., bit stuffing and NRZI encoding) to the serial bitstream from parallel-to-serial converter 1642 to generate an outgoing serial signal SSER, which is then converted to an outgoing differential data signal DDAT by differential transceiver 1372.

An incoming serial signal SSER (generated by differential transceiver 1372 from an incoming differential signal DDAT) is decoded by decoder 1653 according to the predetermined encoding protocol (e.g., bit stuffing and NZRI). In one embodiment, encoder 1653 can also include clock recovery logic and an elastic store buffer to compensate for localized timing problems (e.g., jitter).

The decoded signal generated by decoder 1653 is parallelized by serial-to-parallel converter 1652 and sent to read FIFO 1651, CRC detector 1654, command/data detector 1655, sync detector 1656, and EOP detector 1657. Sync detector 1656 identifies synchronization fields in the incoming signals, and upon detection of a synchronization field, initiates packet reception by providing a signal START to read FIFO 1651, CRC detector 1654, command/data detector 1655, and EOP detector 1657.

In response to signal START, read FIFO 1651 begins storing the contents of the incoming signal (from serial-to-parallel converter 1652), while CRC detector 1654 performs a CRC check on the incoming data (optionally based on input from command/data detector 1655). Note that various error handling procedures can be performed if the CRC check fails, including terminating the process, or requesting re-transmission of the command/data.

Finally, when EOP detector 1657 detects an EOP field, EOP detector 1657 ends the packet reception by issuing a signal STOP to read FIFO 1651, CRC detector 1654, command/data detector 1655, and EOP detector 1657. Protocol controller 1360 then reads the packet data (which can be either a status (ST) or data (DAT) signal) from read FIFO 1651, after which the next packet reception can begin. In this manner, read FIFO 1651, CRC detector 1654, command/data detector 1655, and EOP detector 1657 can act as de-packetizing logic for serial interface engine 1371.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

The invention claimed is:

1. A flash memory card comprising:
   a predetermined pin assignment based on a pin count of the flash memory card, the pin assignment including a set of pins for connected to two pairs of differential serial data lines, wherein each pair of the differential serial data lines carry a positive (+) signal and a negative (−) signal;
   a flash memory array;
   a protocol controller for accessing the flash memory array; and
   a differential datapath capable of converting an incoming differential signal into a status signal for the protocol controller and an incoming data signal for the protocol controller, and capable of converting a control signal from the protocol controller and an outgoing data signal from the protocol controller into an outgoing differential signal, wherein the differential datapath comprises:
      a differential transceiver for converting the incoming differential signal into an incoming multipurpose serial signal, and for converting an outgoing multipurpose serial signal into the outgoing differential signal; and
      a differential serial interface engine for converting the incoming multipurpose serial signal into at least one of the status signal and the incoming data signal, and for converting at least one of the control signal and the outgoing data signal into the outgoing multipurpose serial signal, wherein the differential serial interface engine comprises:
         a synchronization detector for identifying a synchronization field in the first set of signals, and upon detection of the synchronization field, initiating packet reception by generating a start signal;
         a write first-in-first-out (FIFO) memory for storing the first set of signals in response to the start signal and outputting at least one of the status signal and the incoming data signal;

a CRC (cyclic redundancy check) detector for performing a CRC check on the first set of signals in response to the start signal;

a command/data detector for determining whether the first set of signals are one of command signals and data signals in response to the start signal and providing that determination to the CRC detector;

a start-of-frame (SOF) detector for detecting SOF fields in the first set of signals in response to the start signal and, upon such detection, triggering a local clock generation; and an end-of-packet (EOP) detector for detecting an EOP field in the first set of signals in response to the start signal and, upon such detection, issuing a stop signal to the write FIFO, the CRC detector, the command/data detector, and the SOF detector;

wherein the flash memory card comprises one of a MultiMediaCard, a Secure-Digital card, a CompactFlash card, and a Memory Stick.

2. An electronic device comprising:

a host card adapter for interfacing with the flash memory card, the host card adapter comprising a predetermined pin assignment based on a pin count of the flash memory card, the pin assignment including a set of pins for connecting to two pairs of differential serial data lines, wherein each pair of the differential serial data lines carry a positive (+) signal and a negative (−) signal;

a protocol controller;

an application adapter for controlling the protocol controller, the application adapter providing a bridge between device-specific communications and card-specific communications;

a differential datapath capable of converting an incoming differential signal into a status signal for the protocol controller and an incoming data signal for the protocol controller, and capable of converting a control signal from the protocol controller and an outgoing data signal from the protocol controller into an outgoing differential signal, wherein the differential datapath comprises:

a differential transceiver for converting the incoming differential signal into an incoming multipurpose serial signal, and for converting an outgoing multipurpose serial signal into the outgoing differential signal; and a differential serial interface engine for converting the incoming multipurpose serial signal into at least one of the status signal and the incoming data signal, and for converting at least one of the control signal and the outgoing data signal into the outgoing multipurpose serial signal, wherein the differential serial interface engine comprises:

a synchronization detector for identifying a synchronization field in the first set of signals, and upon detection of the synchronization field, initiating packet reception by generating a start signal;

a read first-in-first-out (FIFO) memory for storing the first set of signals in response to the start signal and outputting at least one of the status signal and the incoming data signal;

a CRC (cyclic redundancy check) detector for performing a CRC check on the first set of signals in response to the start signal;

a command/data detector for determining whether the first set of signals are one of command signals and data signals in response to the start signal and providing that determination to the CRC detector;

a start-of-frame (SOF) detector for detecting SOF fields in the first set of signals in response to the start signal and, upon such detection, triggering a local clock generation; and an end-of-packet (EOP) detector for detecting an EOP field in the first set of signals in response to the start signal and, upon such detection, issuing a stop signal to the read FIFO, the CRC detector, and the command/data detector;

wherein the flash memory card comprises one of a MultimediaCard, a Secure-Digital card, a CompactFlash card and a Memory-Stick.

3. A method of performing an operation on a flash memory card, the operation being requested by a host platform, which is separate from the flash memory card, the operation using a set of pins for connecting to two pairs of differential serial data lines, wherein each pair of the differential serial data lines carry a positive (+) signal and a negative (−) signal, the method comprising:

sending commands from the host platform to the flash memory card;

recognizing the flash memory card;

initializing the protocol of the flash memory card;

controlling the initializing and providing a bridge between device-specific communications and card-specific communications;

converting an incoming differential signal into an incoming multipurpose serial signal, and for converting an outgoing multipurpose serial signal into an outgoing differential signal; and converting the incoming multipurpose serial signal into at least one of a status signal and an incoming data signal, and for converting at least one of a control signal and an outgoing data signal into the outgoing multipurpose serial signal:

identifying a synchronization field in a first set of signals, and upon detection of the synchronization field, initiating packet reception by generating a start signal;

storing the first set of signals in response to the start signal and outputting at least one of the status signal and the incoming data signal;

performing a cyclic redundancy check (CRC) check on the first set of signals in response to the start signal;

determining whether the first set of signals are one of command signals and data signals in response to the start signal and using that determination when performing the CRC check;

detecting start-of-frame (SOF) fields in the first set of signals in response to the start signal and, upon such detection, triggering a local clock generation; and detecting an end-of-packet (EOP) field in the first set of signals in response to the start signal and, upon such detection, issuing a stop signal to storing the first set of signals, performing the CRC check, and determining whether the first set of signals are one of command signals and data signals.

* * * * *